(12) United States Patent
Morishita et al.

(10) Patent No.: US 11,940,548 B2
(45) Date of Patent: Mar. 26, 2024

(54) ESTIMATION AND IDENTIFICATION DEVICE AND ESTIMATION AND IDENTIFICATION SYSTEM

(71) Applicant: Panasonic Intellectual Property Management Co., Ltd., Osaka (JP)

(72) Inventors: Yohei Morishita, Kanagawa (JP); Junji Sato, Tokyo (JP); Naganori Shirakata, Kanagawa (JP); Hidekuni Yomo, Kanagawa (JP); Kenta Iwasa, Tokyo (JP); Kazuma Nishiyasu, Osaka (JP); Mei Okamoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 408 days.

(21) Appl. No.: 17/337,105

(22) Filed: Jun. 2, 2021

(65) Prior Publication Data
US 2021/0286040 A1    Sep. 16, 2021

Related U.S. Application Data

(63) Continuation of application No. PCT/JP2019/047685, filed on Dec. 5, 2019.

(30) Foreign Application Priority Data

Dec. 5, 2018 (JP) ................................. 2018-227966

(51) Int. Cl.
*H04W 4/029* (2018.01)
*G01S 5/02* (2010.01)
*G01S 11/02* (2010.01)

(52) U.S. Cl.
CPC ........ *G01S 5/0295* (2020.05); *G01S 5/02521* (2020.05); *G01S 5/0278* (2013.01); *G01S 11/02* (2013.01); *H04W 4/029* (2018.02)

(58) Field of Classification Search
CPC .. G01S 5/0295; G01S 5/02521; G01S 5/0278; G01S 5/0263; G01S 11/02; G01S 13/66; G01S 13/86; H04W 4/029
See application file for complete search history.

(56) References Cited

U.S. PATENT DOCUMENTS

| 5,670,961 A * | 9/1997 | Tomita ................. G01S 13/867 342/36 |
| 2015/0019161 A1* | 1/2015 | Moriguchi ............ G01S 5/0294 702/150 |

(Continued)

FOREIGN PATENT DOCUMENTS

| JP | H08-146130 A | 6/1996 |
| WO | WO 2013128852 A1 | 9/2013 |

OTHER PUBLICATIONS

International Search Report, dated Feb. 25, 2020, which correspond to PCT/JP2019/047685, 4 pages.

(Continued)

*Primary Examiner* — Siu M Lee
(74) *Attorney, Agent, or Firm* — Seed IP Law Group LLP

(57) ABSTRACT

Provided is an improved estimation and identification device that estimates the position of a plurality of identification targets and identifies the plurality of identification targets. The estimation and identification device has a configuration comprising: a plurality of tracking devices that emit electromagnetic waves or sound waves and detect the position of an identification target on the basis of reflected electromagnetic waves or sound waves from the identification target holding a wireless transmission terminal; a plurality of wireless communications devices that wirelessly communicate with wireless communications terminals and receive identification information for the wireless communications terminals from the wireless communications terminals; and an analysis circuit that identifies the identification target and (Continued)

estimates the position of the identification target, on the basis of the results of the wireless communications results, the detected position of the identification target, and the identification information.

13 Claims, 28 Drawing Sheets

(56) References Cited

U.S. PATENT DOCUMENTS

2017/0212232 A1* 7/2017 Fujioka ................ G01S 13/726
2021/0333358 A1* 10/2021 Park ....................... G01S 13/86

OTHER PUBLICATIONS

Leppäkoski, H. et al., "Optimizing radio map for WLAN fingerprinting," Tampere University of Technology, Proceedings of the International Conference on Ubiquitous Positioning, Indoor Navigation and Location-Based Service UPINLBS 2010, Oct. 14-15, 2010, Kirkkonummi, Finland, 9 pages.

* cited by examiner

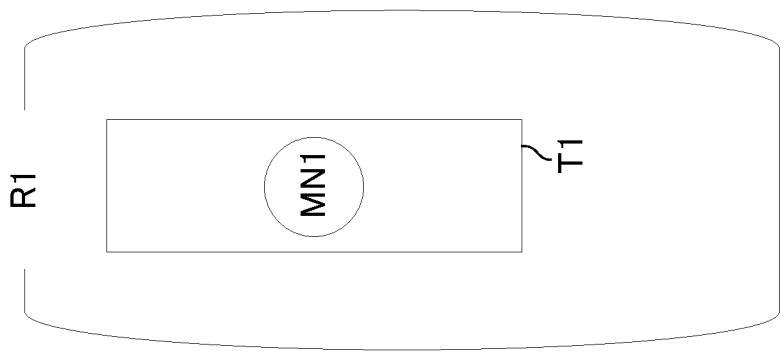
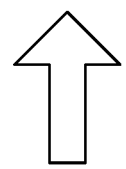
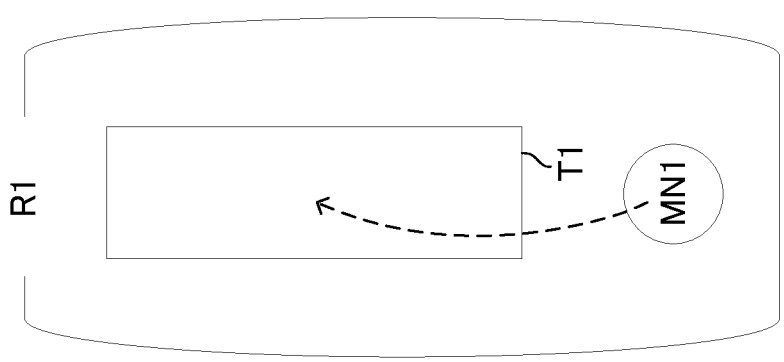
FIG. 7A

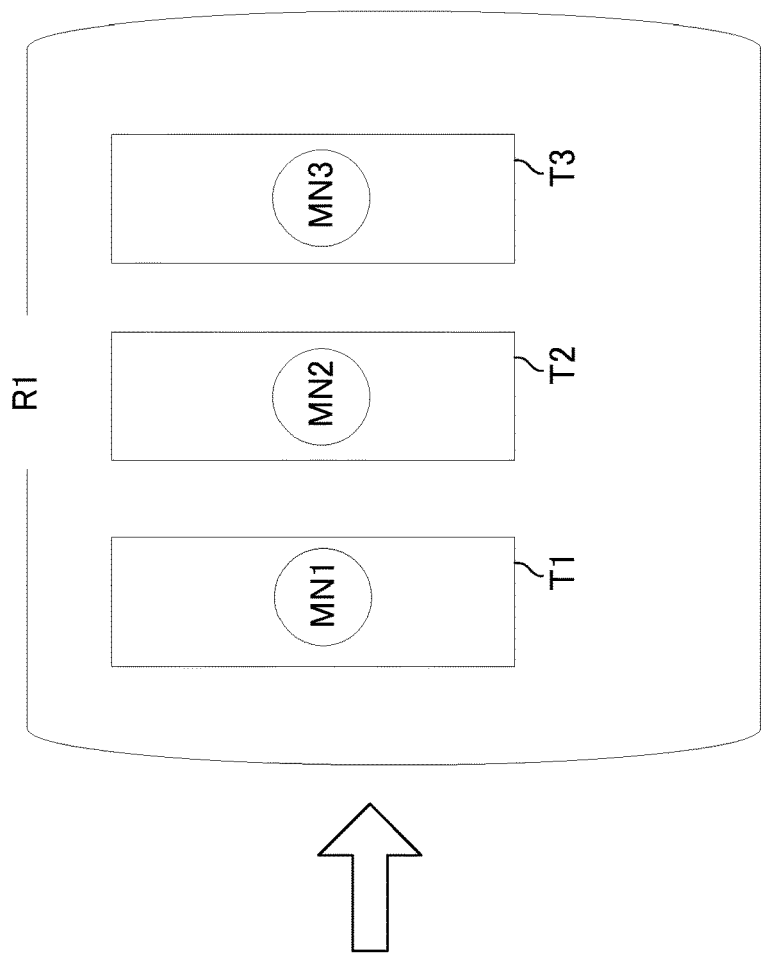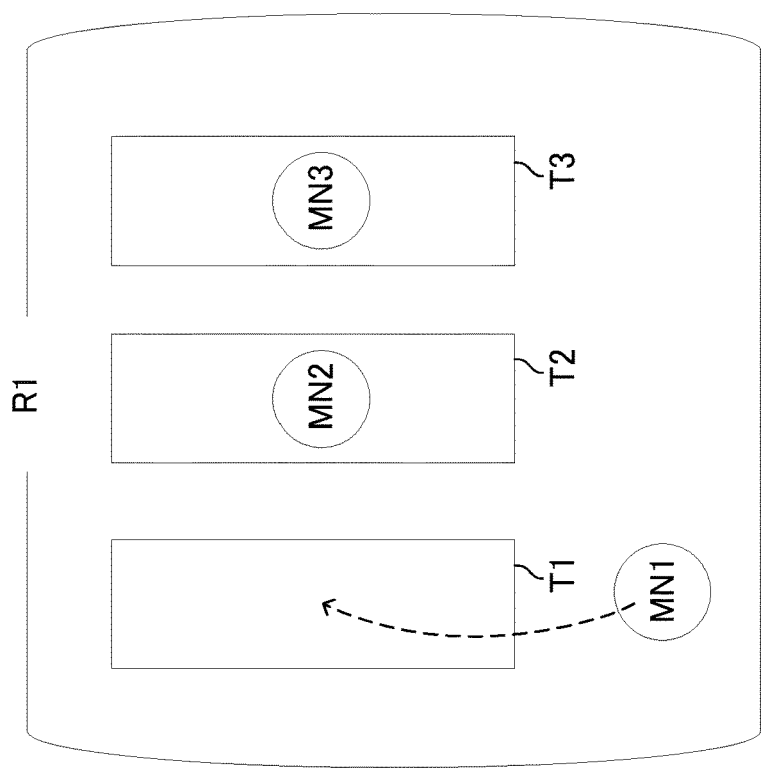
FIG. 7B

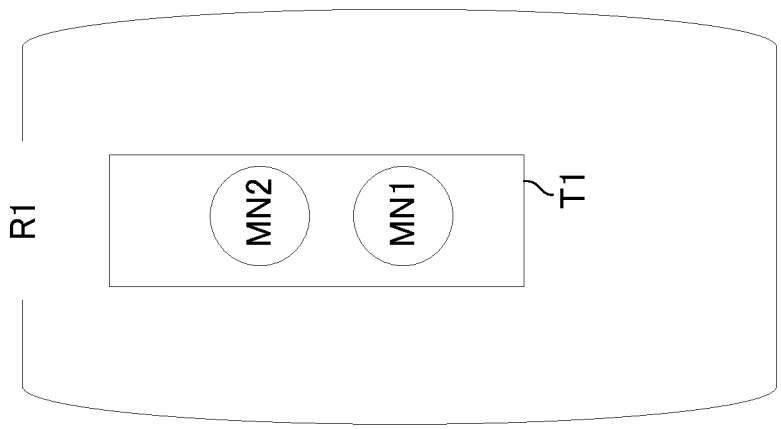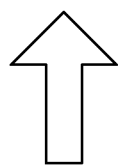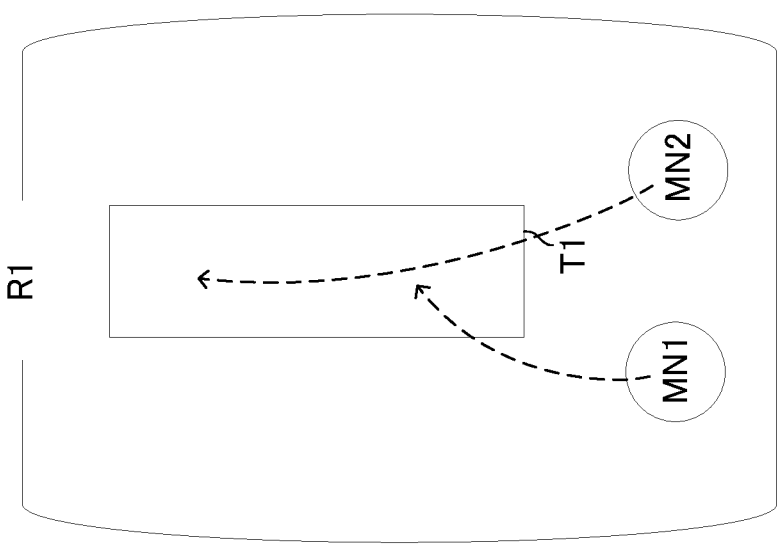
FIG. 9A

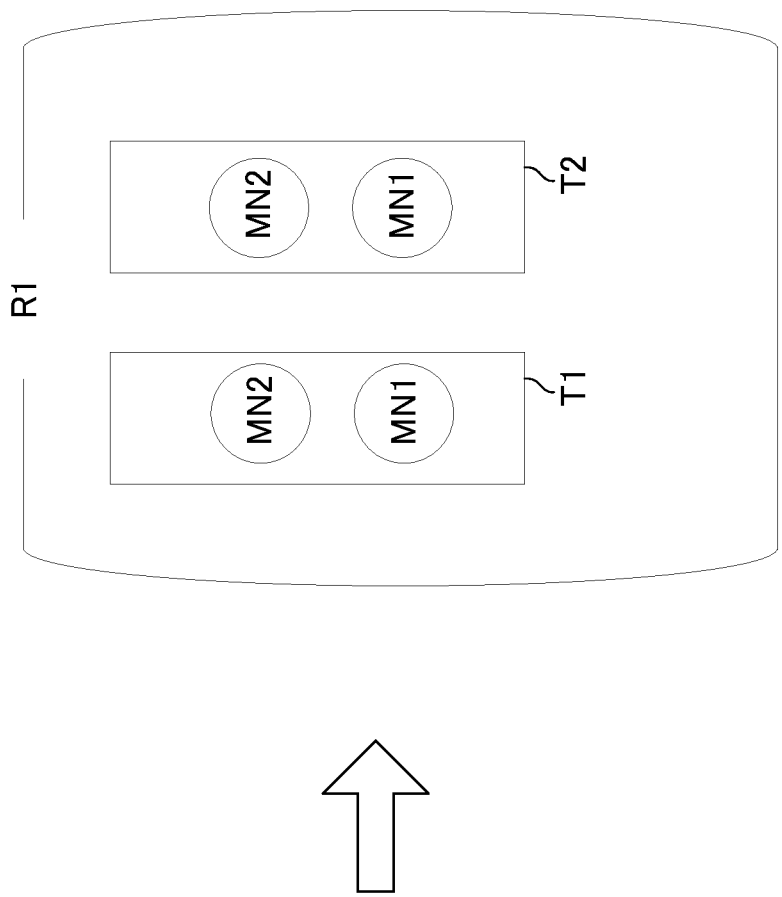
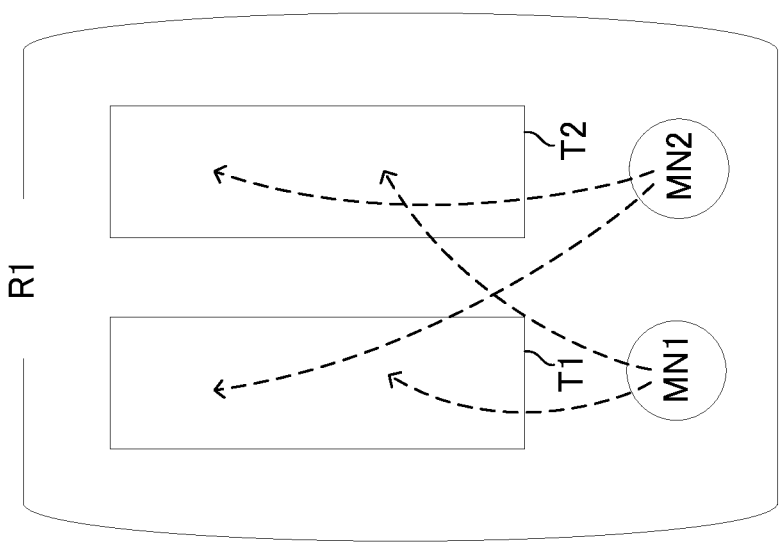
FIG. 9B

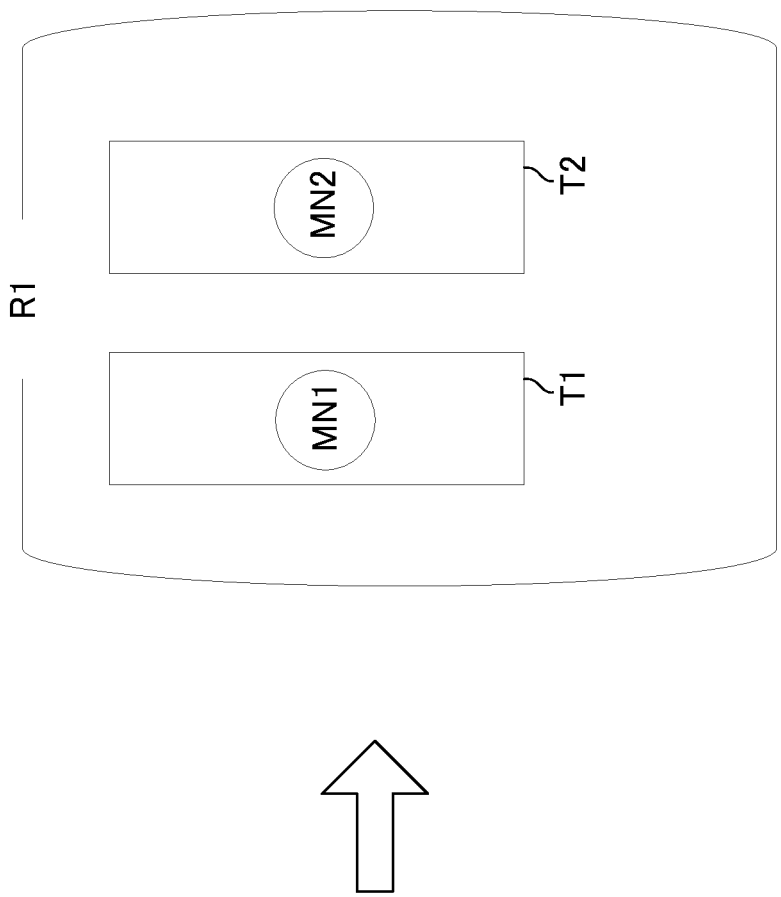
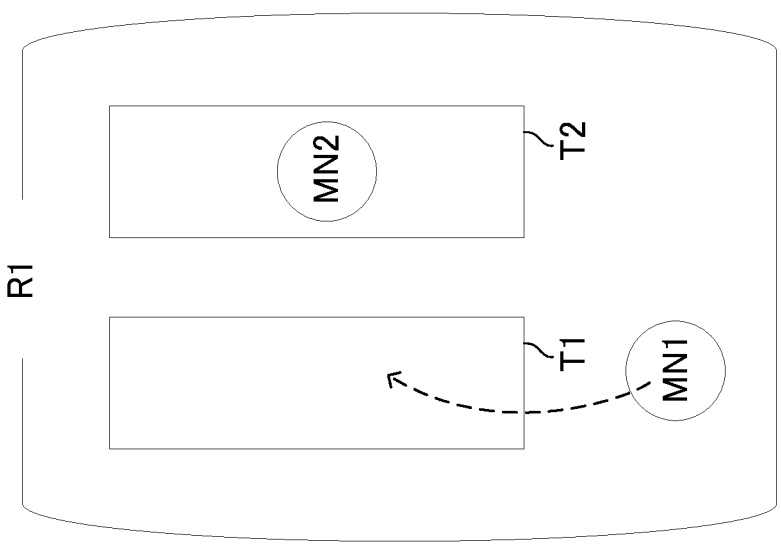
FIG. 9C

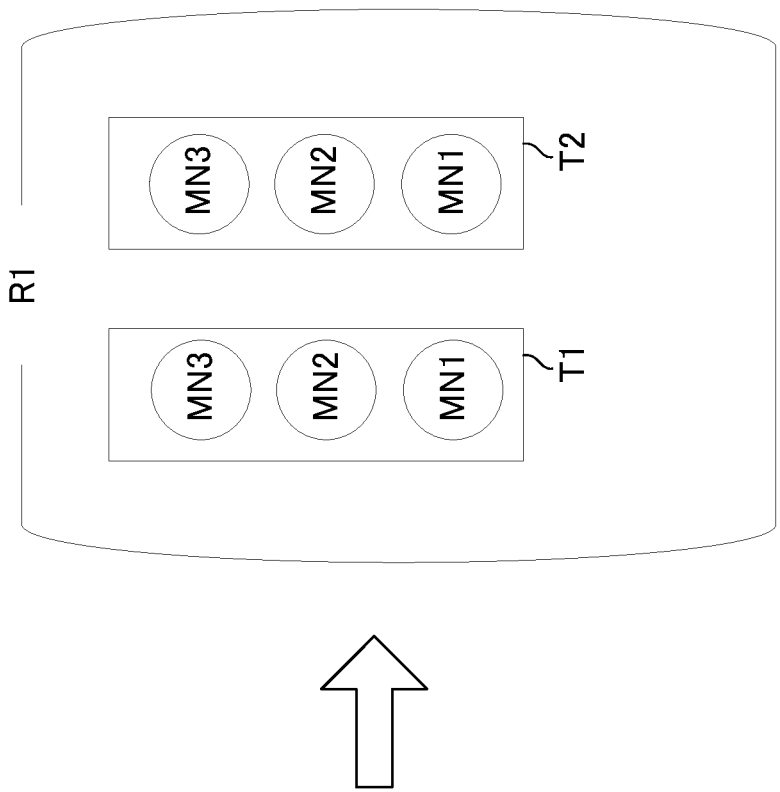
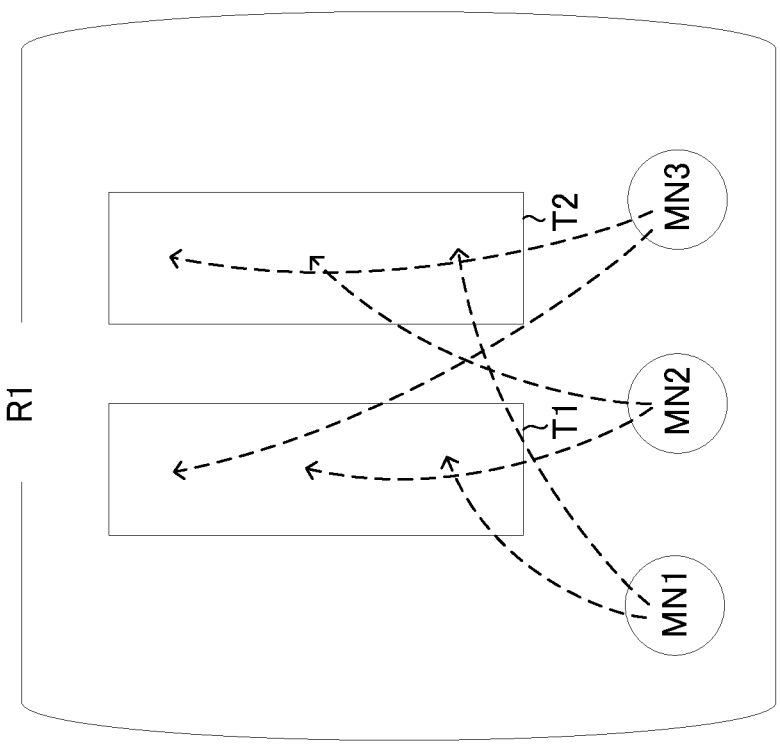
FIG. 10A

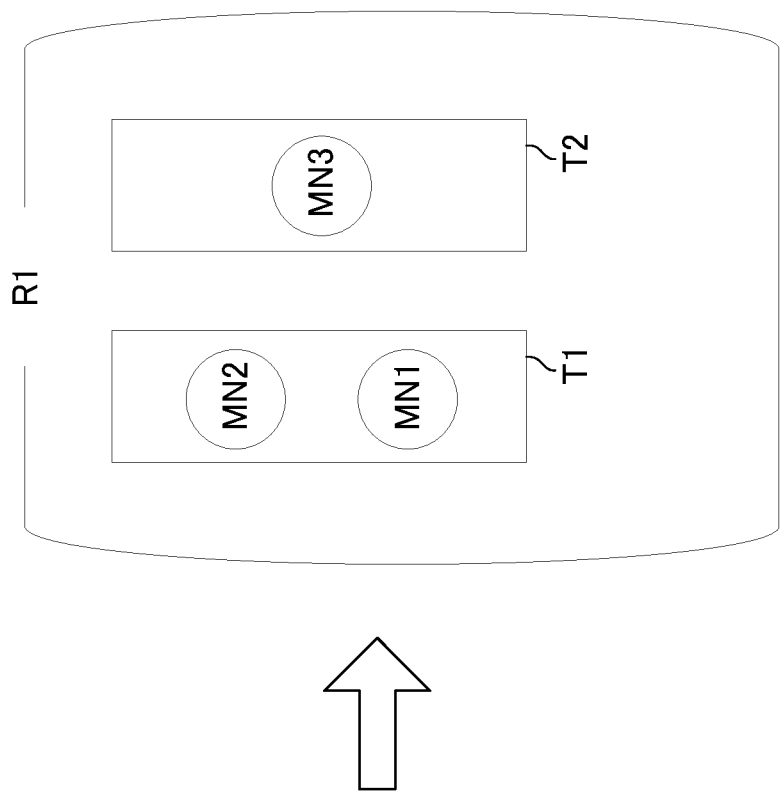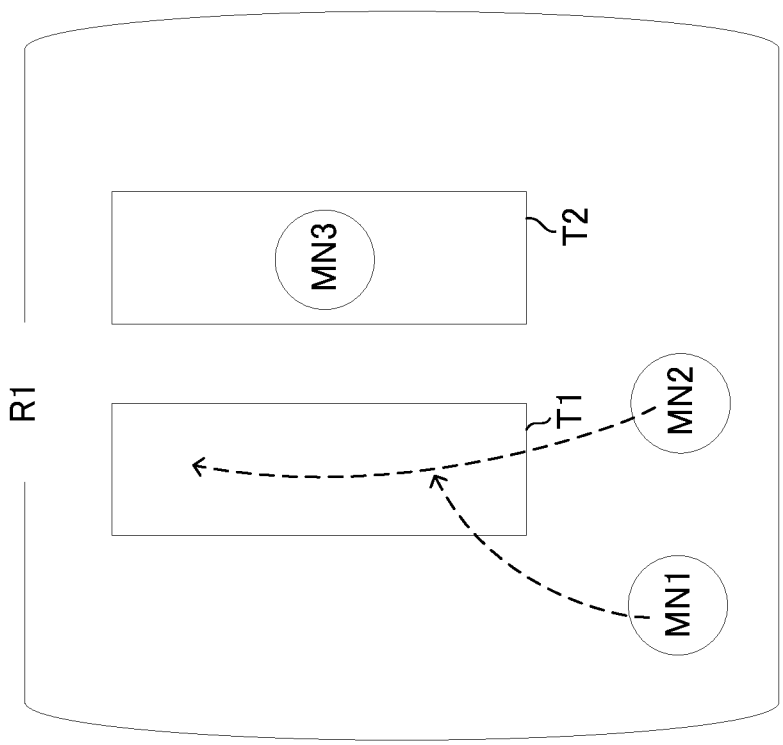
FIG. 10B

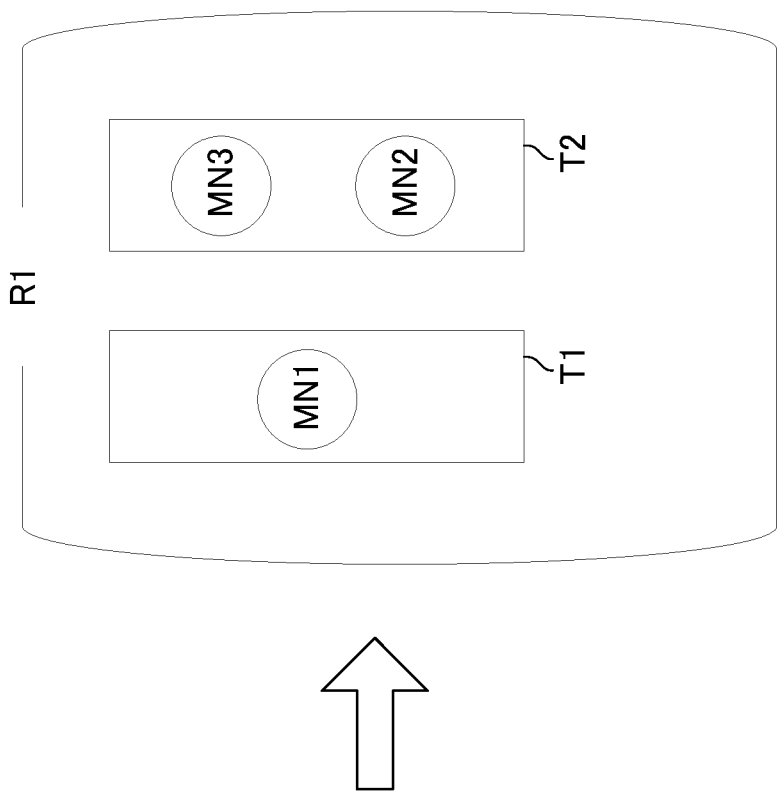
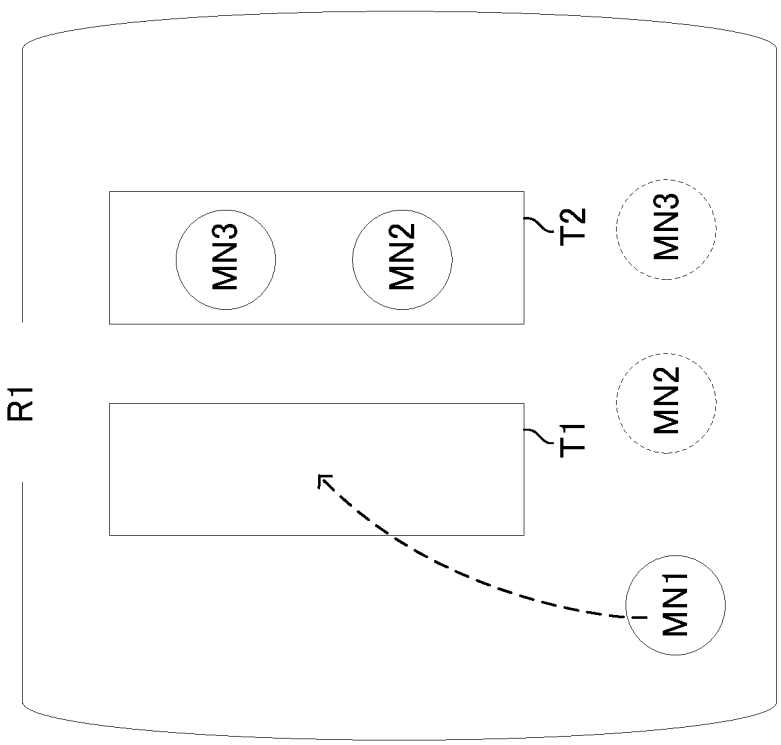
FIG. 10C

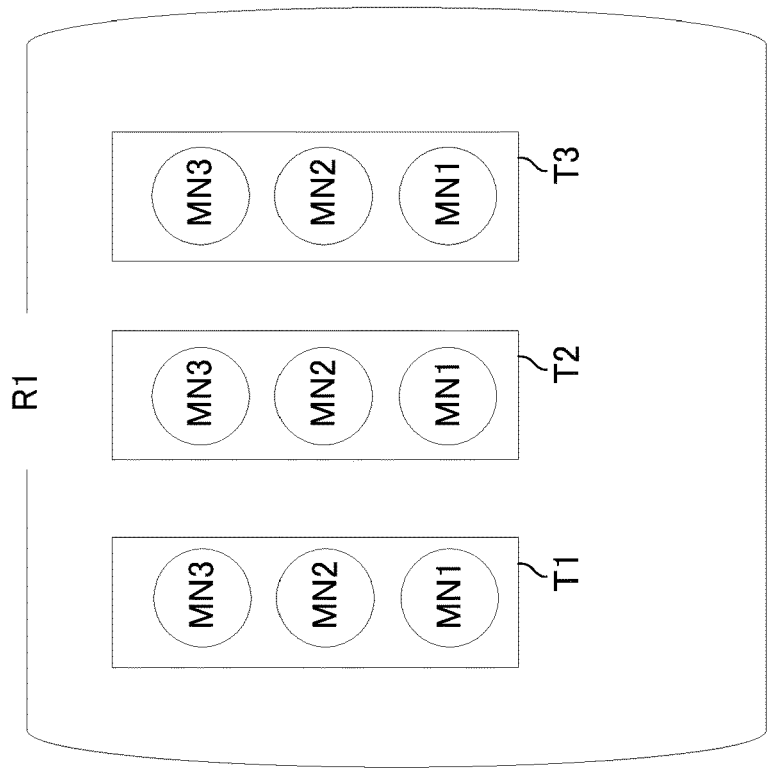
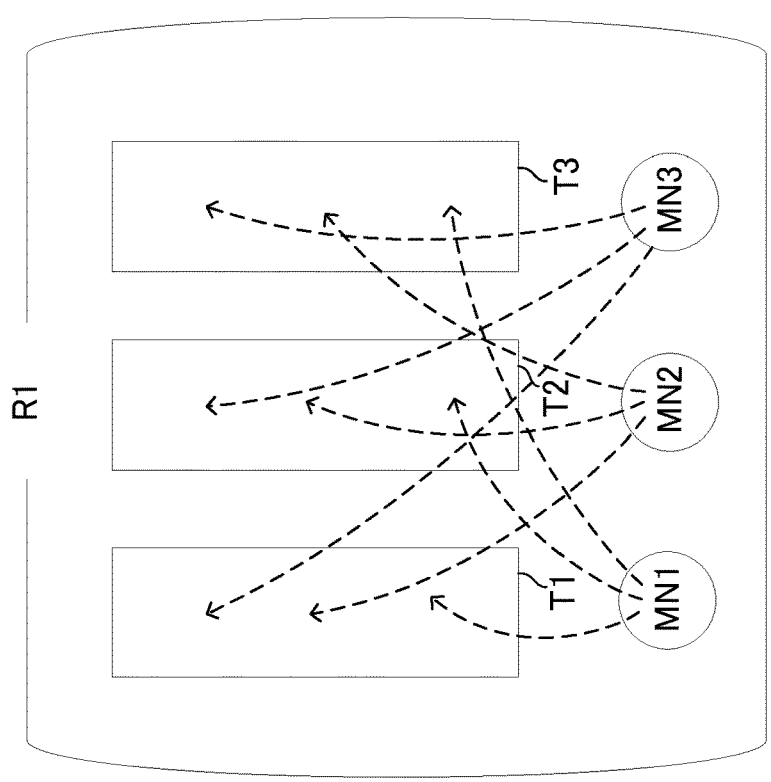
FIG. 11A

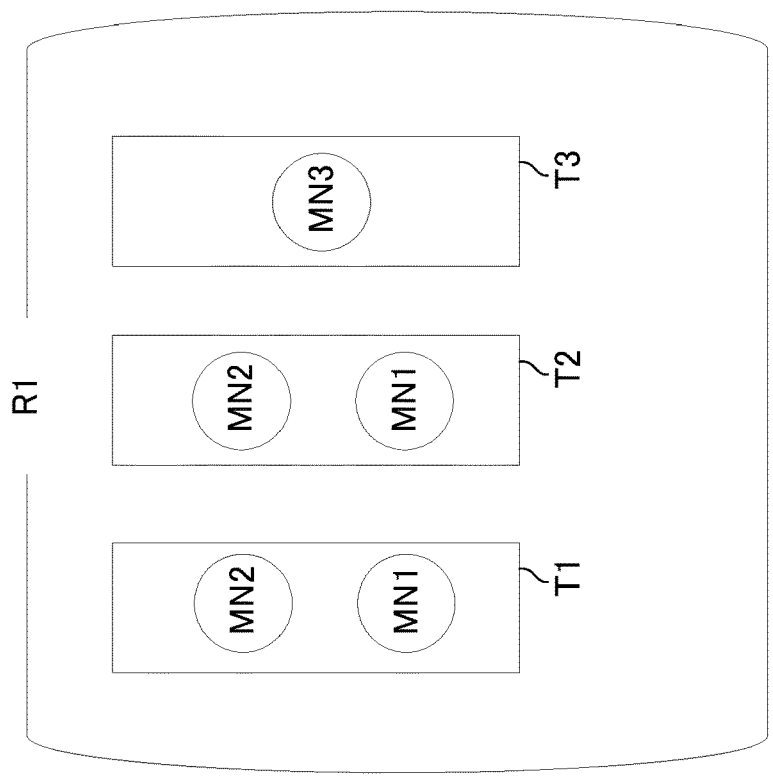
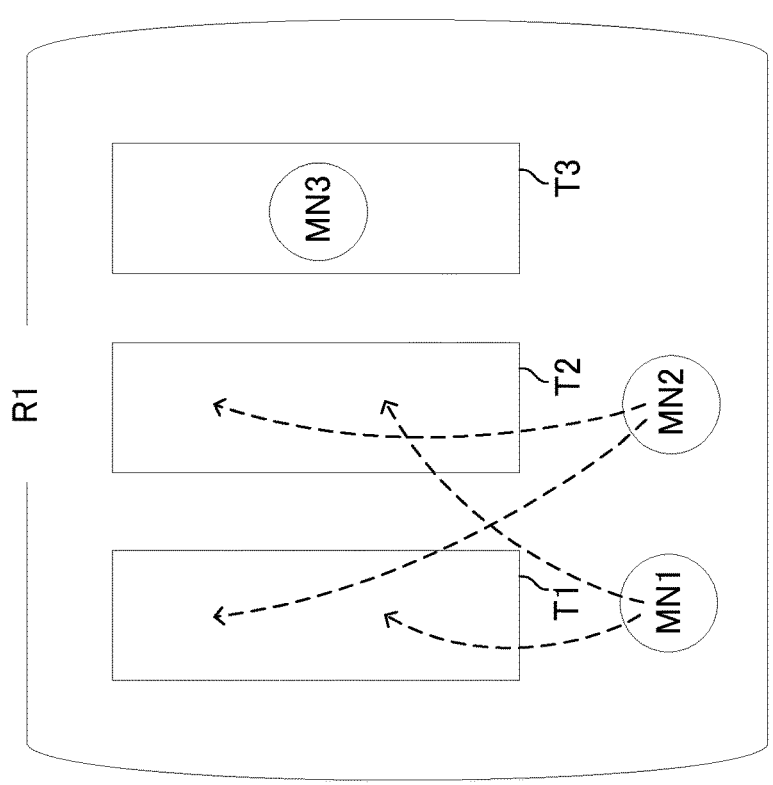
FIG. 11B

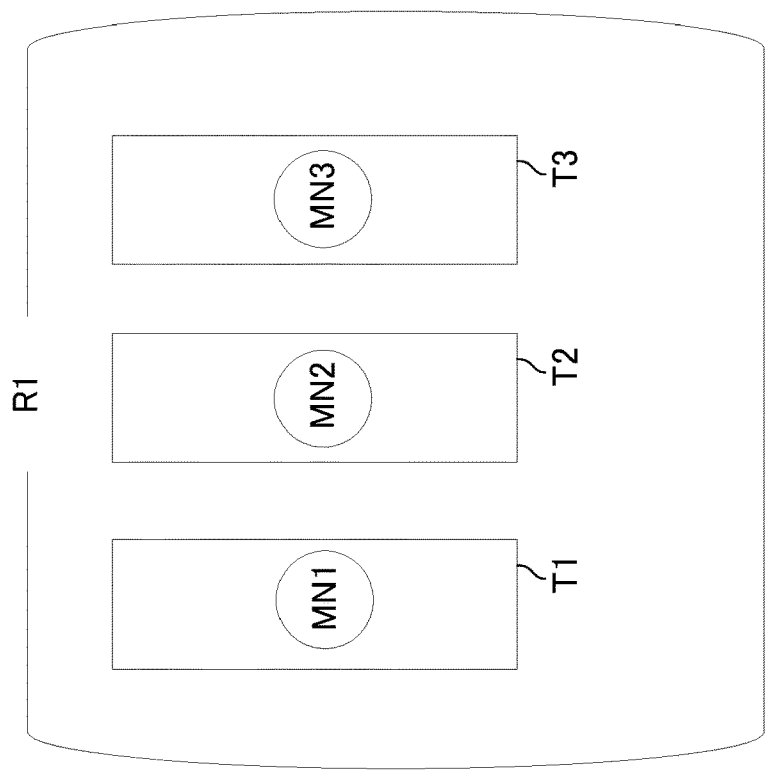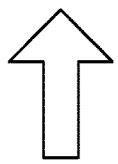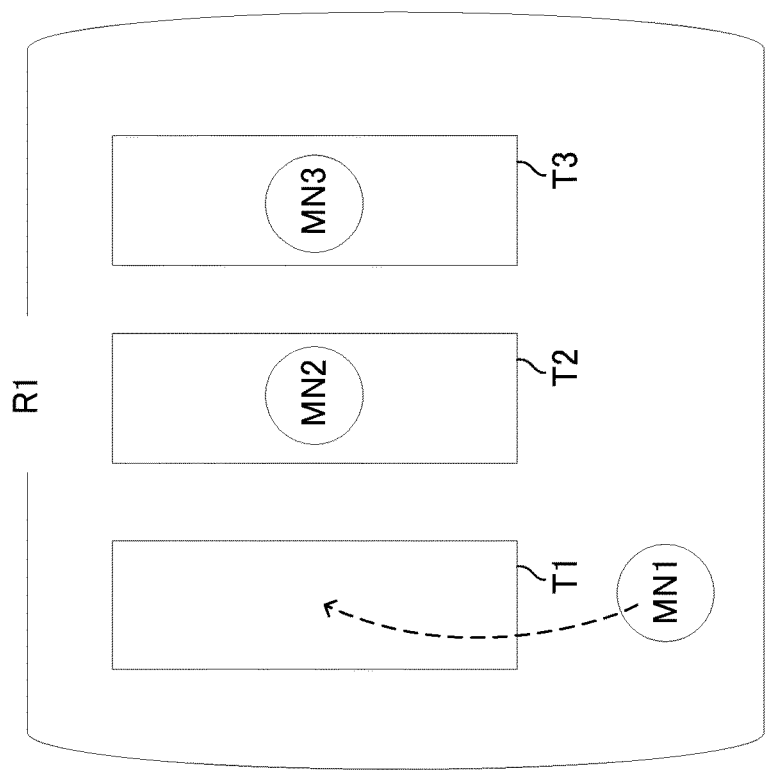
FIG. 11C

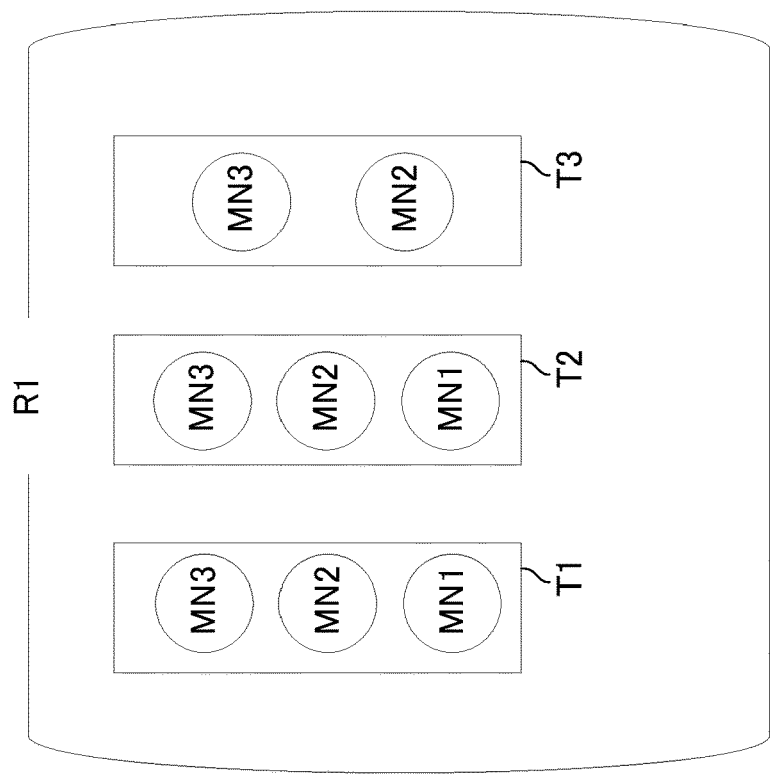
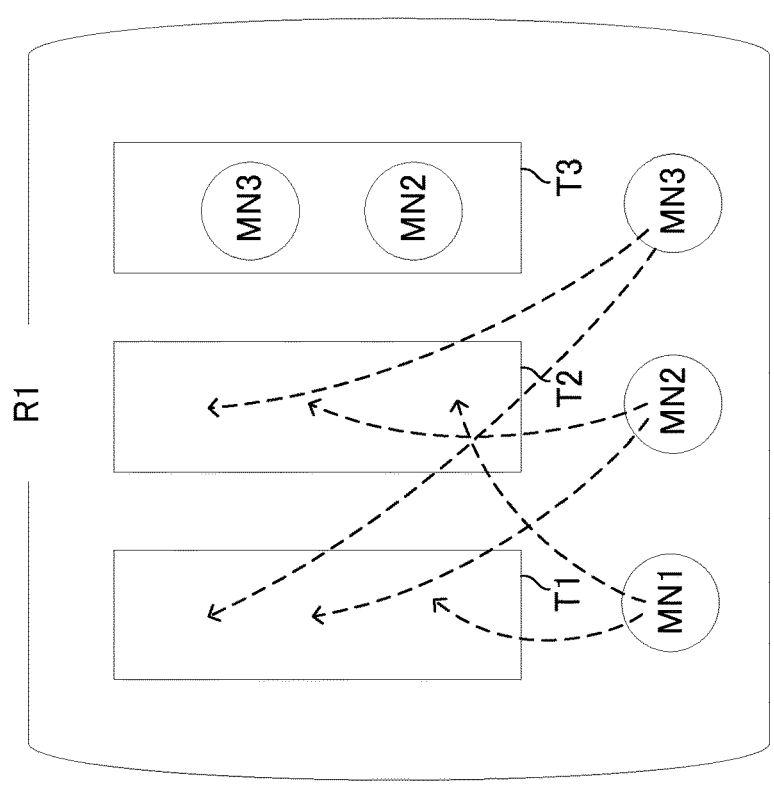
FIG. 11D

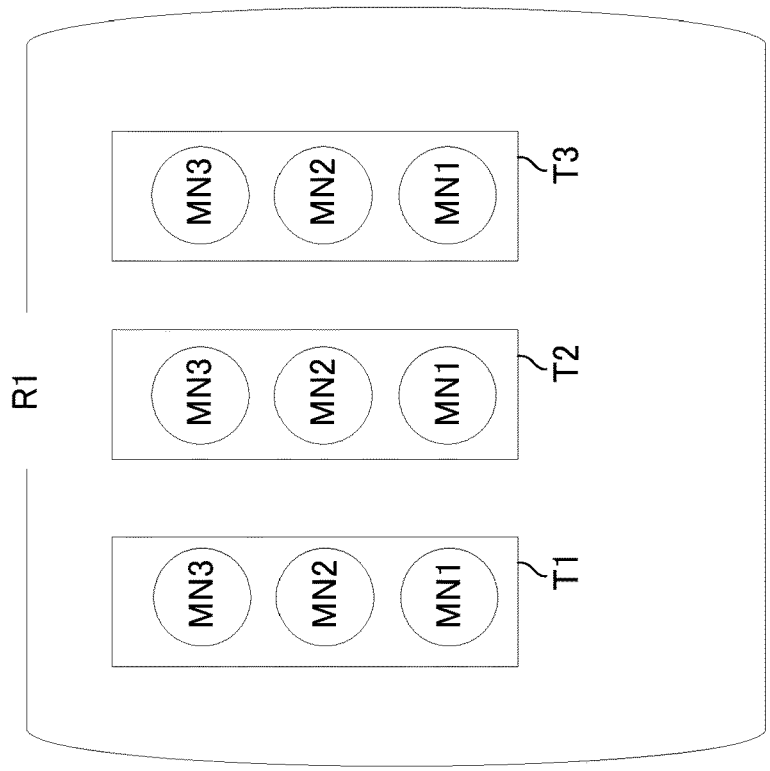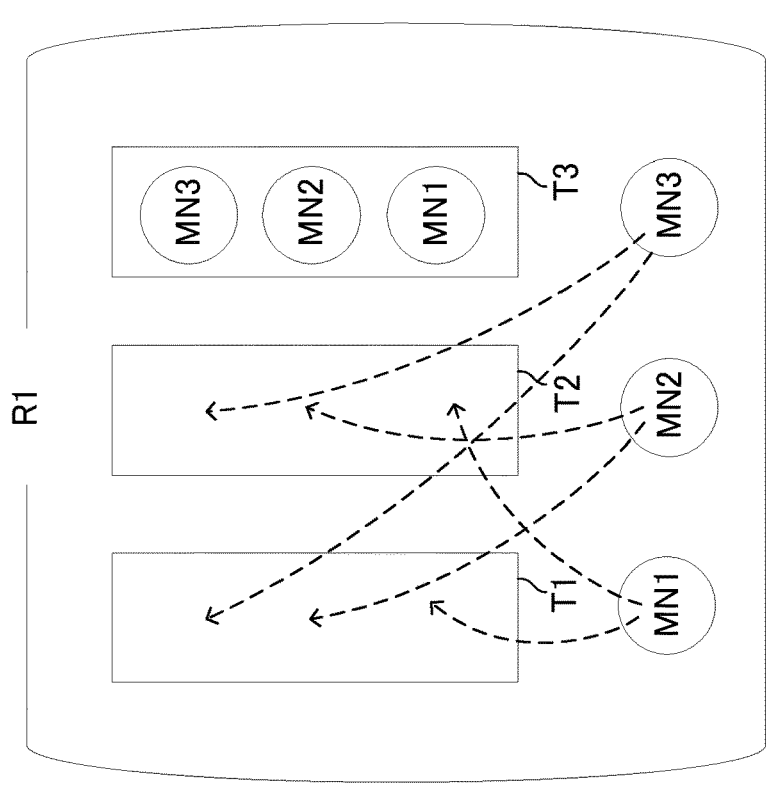
FIG. 11E

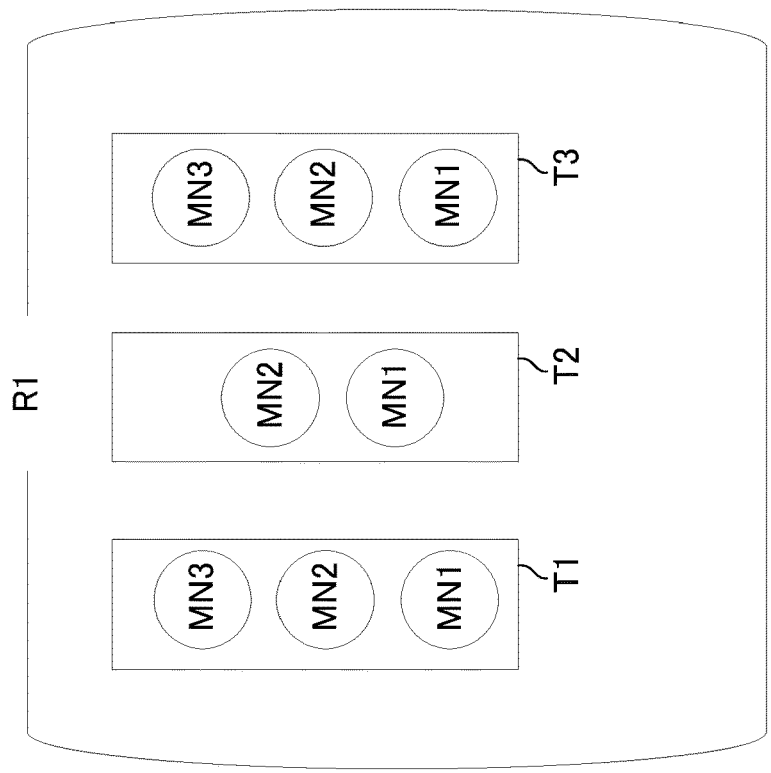
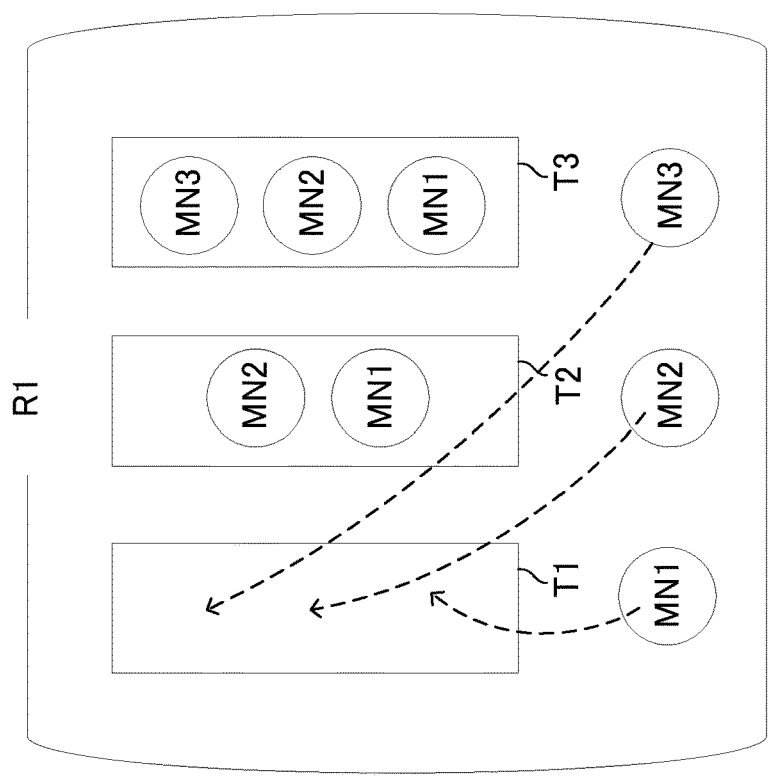
FIG. 11F

ESTIMATION AND IDENTIFICATION DEVICE AND ESTIMATION AND IDENTIFICATION SYSTEM

TECHNICAL FIELD

The present disclosure relates to an estimation and identification apparatus, and an estimation and identification system.

BACKGROUND ART

Received Signal Strength Indicator (RSSI) fingerprinting is known as a technique of estimating positions of radio communication terminals.

Non Patent Literature (hereinafter, referred to as "NPL") 1 discloses, for example, the following technique using RSSI fingerprints. The RSSI fingerprints are collected in advance from access points around a radio communication terminal to be a target of position estimation, and registered in a database. The position of the radio communication terminal is estimated by pattern matching between RSSI fingerprints collected during the position estimation of the radio communication terminal and the RSSI fingerprints registered in the database.

CITATION LIST

Non-Patent Literature

NPL 1
Helena Leppakoski, Sija Tikkinen and Jarmo Takala, "Optimizing Radio Map for WLAN Fingerprinting", International Conference on Ubiquitous Positioning Indoor Navigation and Location Based Service, pp. 1-8 (online), DOI: 10.1109/UPINLBS.2010.5654332(2010).

SUMMARY OF INVENTION

Technical Problem

One non-limiting and exemplary embodiment facilitates providing an improved estimation and identification apparatus that estimates positions of a plurality of identification targets, and identifies the plurality of identification targets.

Solution to Problem

An estimation and identification apparatus according to an embodiment of the present disclosure adopts a configuration including: a plurality of tracking devices, each of which in operation, emits an electromagnetic wave or a sound wave, and detects a position of an identification target holding a radio communication terminal, based on a reflected wave of the electromagnetic wave or the sound wave by the identification target; a plurality of radio communication devices, each of which in operation, performs radio communication with the radio communication terminal, and receives identification information of the radio communication terminal from the radio communication terminal; and analysis circuitry, which, in operation, identifies the identification target and estimates the position of the identification target, based on a result of the radio communication, the detected position of the identification target, and the identification information.

An estimation and identification system according to an embodiment of the present disclosure adopts a configuration including: the estimation and identification apparatus according to the present disclosure; and one or a plurality of radio communication terminals that are capable of performing radio communication with one or the plurality of radio communication devices included in the estimation and identification apparatus, and that transmit specific identification information to at least one of the plurality of radio communication devices.

It should be noted that general or specific embodiments may be implemented as a system, an apparatus, a method, an integrated circuit, a computer program, a storage medium, or any selective combination thereof.

Advantageous Effects of Invention

According to an embodiment of the present disclosure, it is possible to provide an improved estimation and identification apparatus that estimates positions of a plurality of identification targets, and identifies the plurality of identification targets.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 7A illustrates an exemplary linking operation between a target and a radio communication terminal in the flow chart in FIG. 6;

FIG. 7B illustrates another exemplary linking operation between the targets and the radio communication terminals in the flow chart in FIG. 6;

FIG. 9A illustrates an exemplary linking operation between a target and radio communication terminals in the flow chart in FIG. 8;

FIG. 9B illustrates another exemplary linking operation between the targets and the radio communication terminals in the flow chart in FIG. 8;

FIG. 9C illustrates still another exemplary linking operation between the targets and the radio communication terminals in the flow chart in FIG. 8;

FIG. 10A illustrates still another exemplary linking operation between the targets and the radio communication terminals in the flow chart in FIG. 8;

FIG. 10B illustrates still another exemplary linking operation between the targets and the radio communication terminals in the flow chart in FIG. 8;

FIG. 10C illustrates still another exemplary linking operation between the targets and the radio communication terminals in the flow chart in FIG. 8;

FIG. 11A illustrates still another exemplary linking operation between the targets and the radio communication terminals in the flow chart in FIG. 8;

FIG. 11B illustrates still another exemplary linking operation between the targets and the radio communication terminals in the flow chart in FIG. 8;

FIG. 11C illustrates still another exemplary linking operation between the targets and the radio communication terminals in the flow chart in FIG. 8;

FIG. 11D illustrates still another exemplary linking operation between the targets and the radio communication terminals in the flow chart in FIG. 8;

FIG. 11E illustrates still another exemplary linking operation between the targets and the radio communication terminals in the flow chart in FIG. 8;

FIG. 11F illustrates still another exemplary linking operation between the targets and the radio communication terminals in the flow chart in FIG. 8;

DESCRIPTION OF EMBODIMENTS

There have been growing expectations in preschools and daycare that observing activity history of individual children and figuring out events in which the children expressed strong interest, for example, can contribute to supporting their healthier development. However, it is not easy for a man or machine to distinguish among a plurality of children with similar physique or clothing and keep tracking their activities.

With the technique disclosed in NPL 1, having individual children as observation targets respectively wear radio communication terminals allows estimating and identifying locations of the children by estimating positions of the radio communication terminals and identifying the radio communication terminals. It is difficult, however, to estimate the positions of the radio communication terminals with accuracy required for the observation of "activity history" even with the technique disclosed in NPL 1. In addition, the positions of radio communication terminals estimated by the technique disclosed in NPL 1 are limited to positions where RSSI fingerprints have been registered in a database. It is thus required to register the RSSI fingerprints in the database in many places in order to improve the position estimation accuracy. Further, studies have been carried out on increase in cost due to updating the reference database according to a change of the indoor environment and difficulty in estimating positions with high accuracy using a few access points.

Embodiment 1

Hereinafter, embodiments of the present disclosure will be described in detail with reference to the accompanying drawings.

[Configuration of Estimation and Identification System]

Figure 1:
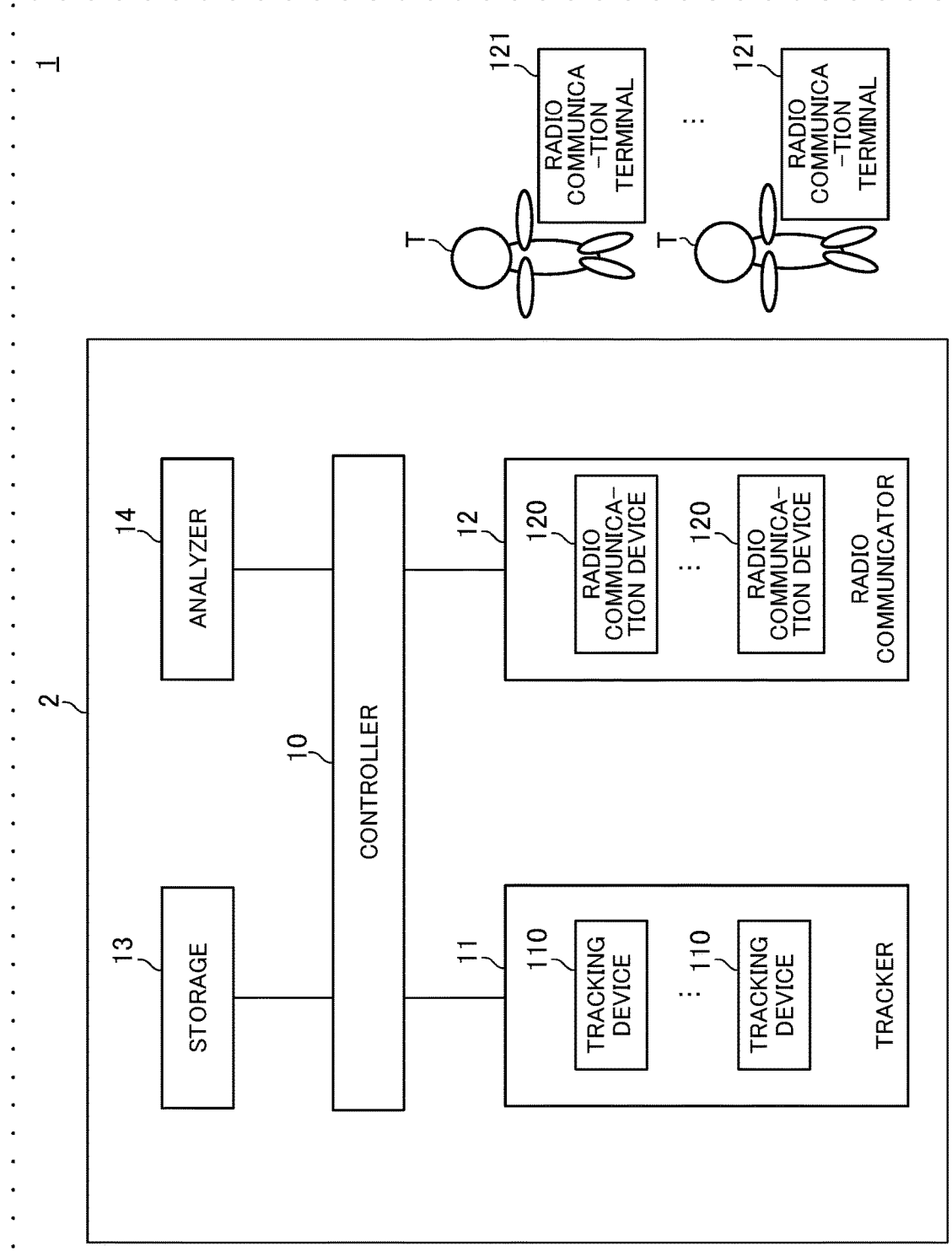
FIG. 1 illustrates an exemplary estimation and identification system.

FIG. 1 illustrates an example of estimation and identification system 1. Estimation and identification system 1 includes estimation and identification apparatus 2, and one or more radio communication terminals 121.

Estimation and identification apparatus 2 identifies an identification target wearing (holding) radio communication terminal 121, and estimates a position of the identification target. The identification target (target T) here includes any reflector that reflects electromagnetic waves or sound waves, such as a person. Estimation and identification apparatus 2 includes controller (control circuitry) 10, tracker (tracking device group) 11, radio communicator (radio communication device group) 12, storage (storage element) 13, and analyzer (analysis circuitry) 14.

Controller 10 controls operations of tracker 11, radio communicator 12, storage 13, and analyzer 14, and implements functions of estimation and identification apparatus 2. Controller 10 is, for example, a processor that reads and executes programs from storage 13.

Tracker 11 emits electromagnetic waves or sound waves, measures reflected waves of the electromagnetic waves or sound waves by the reflectors, and detects positions of the plurality of reflectors (such a position may be referred to as a "detection position"). Tracker 11 includes one or more tracking devices 110. One or more tracking devices 110 each detect directions of one or more targets T. The directions of one or more targets T may be detected by single tracking device 110, and the position of target T may be detected by combining direction detection results from a plurality of tracking devices 110, for example, using a principle of triangulation. Tracking device 110 is, for example, a radar, a time of flight (TOF) sensor, or a sonar. The radar is a millimeter wave radar with a resolution of a few centimeters, for example.

Radio communicator 12 estimates presence ranges of one or more radio communication terminals 121 (such a range may be referred to as an "estimated presence range"). Radio communicator 12 includes a plurality of radio communication devices (access points (APs)) 120. In addition, radio communicator 12 acquires identification information of radio communication terminal 121 via radio communication. Radio communication device 120 is radio communication equipment using, for example, low power communication using the 920 MHz band, IEEE 802.15.4, Zigbee using the 2.4 GHz band, Bluetooth (registered trademark), proximity specific Bluetooth Low Energy (BLE), a wireless LAN (IEEE 802.11b/g/n), a wireless LAN (IEEE 802.11a/ac) or DSRC using the 5 GHz band, a wireless LAN (IEEE 802.11ad) using the 60 GHz band, a private PHS, LTE, or millimeter wave radio communication.

By way of example, radio communicator 12 and radio communication terminal 121 may include the first mode (a communication mode) with a wider coverage area and the second mode (a position estimation mode) with a narrower coverage area. For example, radio communicator 12 operates in the second mode when analyzer 14 performs linking processing, and radio communicator 12 operates in the first mode for other communication.

Storage 13 stores a result of the linking by analyzer 14. By way of example, storage 13 stores a result of ranking by analyzer 14. By way of example, storage 13 stores programs to be executed in estimation and identification apparatus 2. Storage 13 is, for example, a semiconductor memory.

Analyzer 14 combines information indicating the detection positions and information indicating the estimated presence ranges with each other, and links the detection positions of one or more targets T with one or more radio communication terminals 121. Analyzer 14 is, for example, a processor that reads and executes programs from storage 13. Hereinafter, linking the detection position of target T with radio communication terminal 121 is simply referred to as linking target T with radio communication terminal 121 for convenience. The linking will be described later with reference to FIGS. 5 to 11F.

As will be described later, target T wears radio communication terminal 121 corresponding to the target T. In addition, target T is identifiable by identification information of radio communication terminal 121. Using these facts, analyzer 14 identifies who target T is by the identification information and estimates in which position target T is located by the detection position, based on one-to-one linking. The accuracy of the position estimation corresponds to the accuracy according to the resolution of the radar.

By way of example, analyzer 14 ranks a plurality of links between the detection positions of one or more targets T and one or more radio communication terminals 121. The ranking will be described later in detail with reference to FIG. 3.

By way of example, analyzer 14 may figure out behavioral characteristics of specific individuals based on information stored in storage 13. For example, analyzer 14 extracts information such as who (target T1) has spent a long time around whom (target T2), and who (target T3) has spent a long time where, from a history of the links and the ranking stored in storage 13. The extracted information can be used for analysis of interest of the children (targets T), for example. The behavioral characteristics may be analyzed by analyzer 14 or by another computer not illustrated in FIG. 1.

Radio communication terminal 121 is a communication terminal that can communicate with radio communication device 120 by radio. Radio communication terminal 121 is, for example, a mobile node such as a smartphone, an RFID tag, a radio tag, or an IC tag. Radio communication terminal 121 includes identification information specific to this radio communication terminal 121, and transmits the identification information to estimation and identification apparatus 2 via radio communication. As illustrated in FIG. 1, targets T hold radio communication terminals 121 respectively corresponding to the targets T, and targets T are identifiable by the identification information of radio communication terminals 121 worn by the targets T.

By way of example, radio communication terminal 121 may transmit the RSSI transmitted from radio communication device 120 to estimation and identification apparatus 2 via radio communication. Radio communication terminal 121 is radio communication equipment using, for example, the low power communication using the 920 MHz band, IEEE 802.15.4, Zigbee using the 2.4 GHz band, Bluetooth, the wireless LAN (IEEE 802.11b/g/n), the wireless LAN (IEEE 802.11a/ac) or DSRC using the 5 GHz band, the wireless LAN (IEEE 802.11ad) using the 60 GHz band, the private PHS, or LTE.

[Exemplary Usage of Estimation and Identification System]

Figure 2:
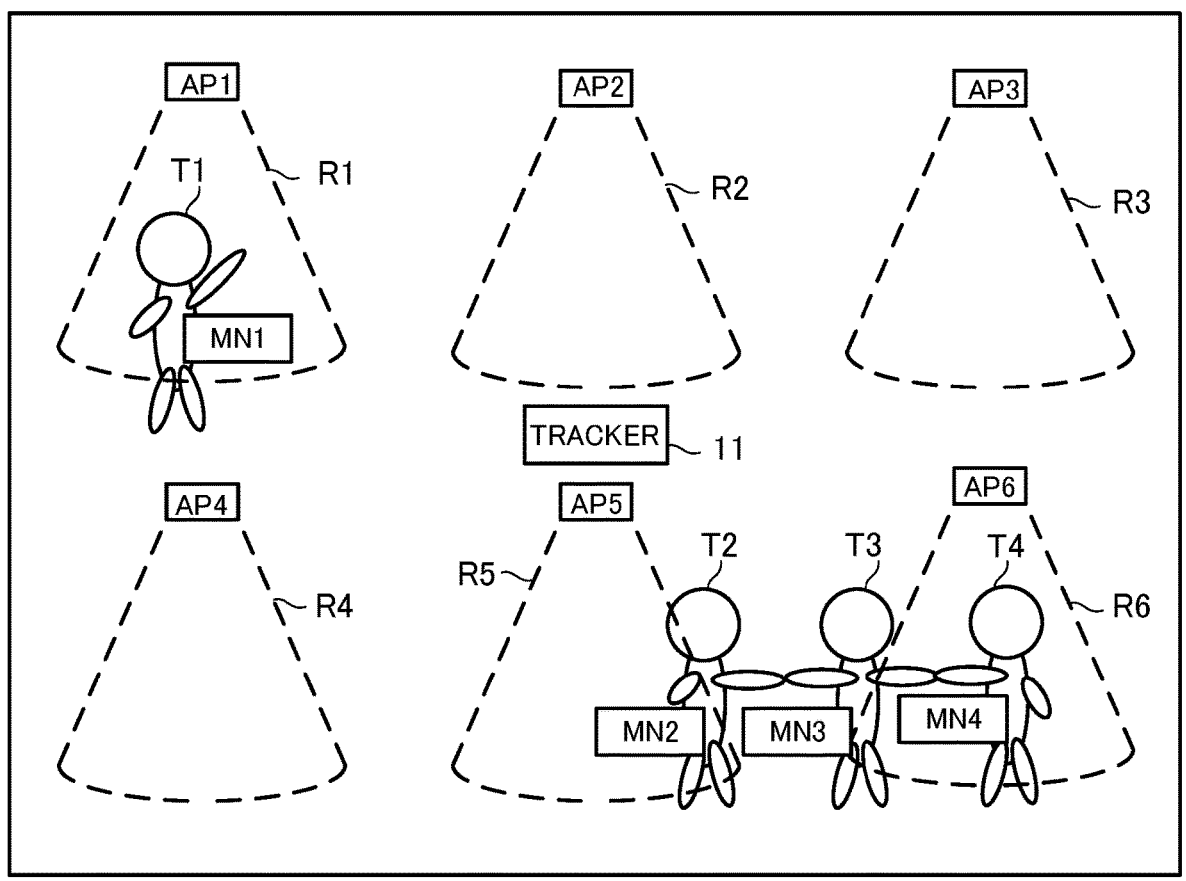
FIG. 2 illustrates an exemplary usage of the estimation and identification system.

FIG. 2 illustrates an exemplary usage of estimation and identification system 1. To be more specific, FIG. 2 describes a use case of identifying where and who a plurality of children are in a classroom of a preschool using estimation and identification system 1 according to the present disclosure.

FIG. 2 illustrates tracker 11 and six radio communication devices 120 (AP1 to AP6) among the components of estimation and identification apparatus 2. The children (targets T1 to T4) respectively wear radio communication terminals 121 (mobile nodes MN1 to MN4) placed in their own name tags.

In FIG. 2, the radar serving as tracker 11 tracks targets T1 to T4 by keeping detecting the positions of targets T1 to T4 in the classroom. However, tracker 11 does not identify who targets T1 to T4 are while determining whether targets T1 to T4 are people.

AP1 to AP6 in FIG. 2 respectively have coverage areas R1 to R6 surrounded by broken lines illustrated in FIG. 2. In other words, mobile nodes MN1 to MN4 can each communicate with AP1 to AP6 when the mobile nodes enter coverage areas R1 to R6. That is, AP1 to AP6 can figure out which mobile nodes MN1 to MN4 are in respective coverage areas R1 to R6.

Here, in a case where radio communicator 12 and radio communication terminals 121 have the first mode (the communication mode) and the second mode (the position estimation mode), radio communicator 12 and radio communication terminals 121 may select the second mode to narrow the coverage areas in order to improve the position estimation accuracy.

However, the resolution of radio communication devices 120 to estimate the positions of mobile nodes MN1 to MN4 is coarser than that of the radar even with the second mode.

Thus, estimation and identification apparatus 2 combines the detection results of tracker 11 with the estimation results of radio communication devices 120 to identify mobile nodes MN1 to MN4 worn by targets T1 to T4, and detects the positions of targets T1 to T4 wearing mobile nodes MN1 to MN4 with the resolution of the radar.

[Operation of Estimation and Identification Apparatus]

Figure 3:
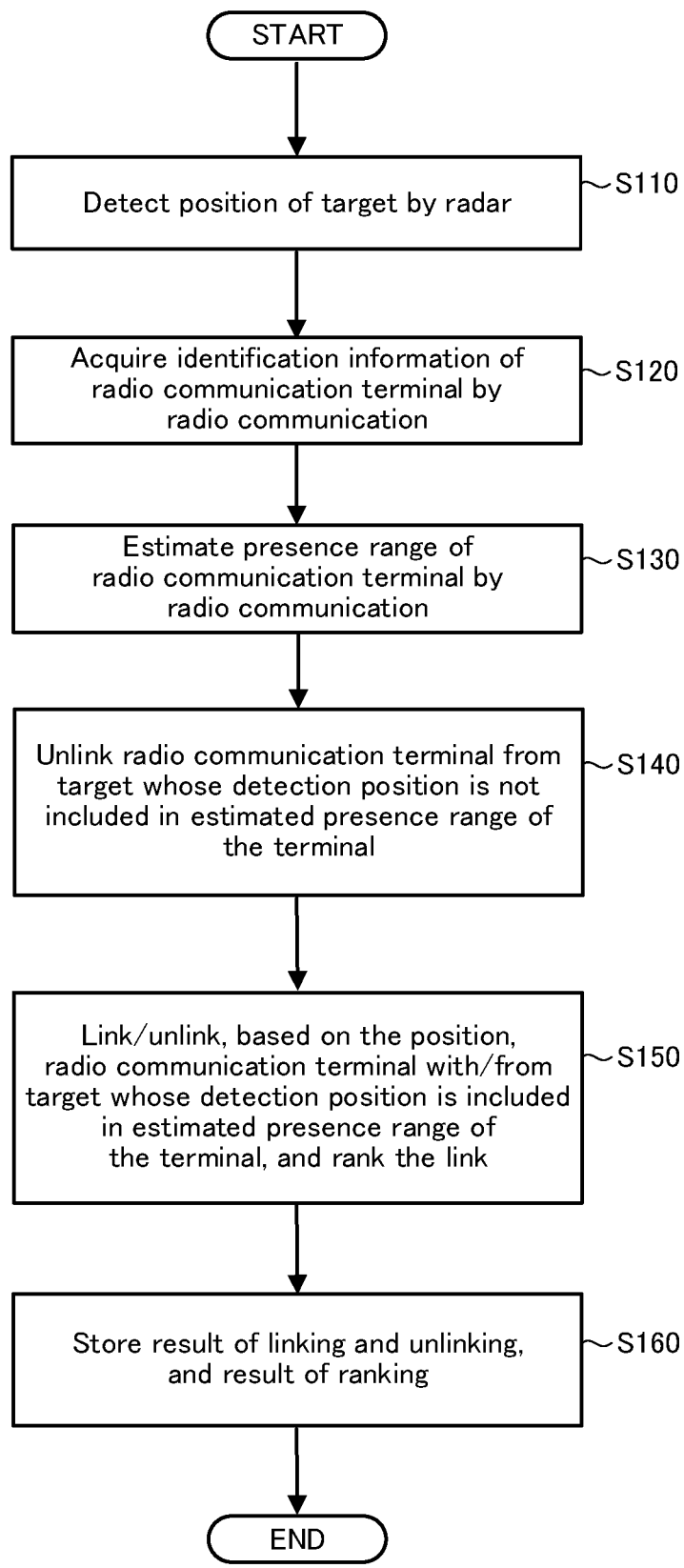
FIG. 3 is a flow chart describing an exemplary operation of an estimation and identification apparatus according to Embodiment 1.

FIG. 3 is a flow chart describing an exemplary operation of estimation and identification apparatus 2 according to Embodiment 1. By way of example, controller 10 controls operations of tracker 11, radio communicator 12, storage 13, and analyzer 14 in accordance with the flow chart illustrated in FIG. 3. The processing in the flow chart illustrated in FIG. 3 may be performed repeatedly.

In step S110, tracker 11 detects the position of target T by the radar. For example, tracker 11 extracts what appears to be a person from a measurement result by signal processing of the radar, and recognizes the extracted object as target T. At this point, estimation and identification apparatus 2 figures out the position of target T with the resolution of the radar using tracker 11.

In step S120, radio communicator 12 acquires the identification information of radio communication terminal 121 by radio communication. By way of example, radio communicator 12 operates in the first mode (the communication mode) during step S120.

In step S130, radio communicator 12 estimates the presence range of radio communication terminal 121 by radio communication. The estimated presence range is, for example, a coverage area of one of radio communication devices 120 included in radio communicator 12. For example, radio communicator 12 determines whether radio communication terminal 121 is included in the coverage area of radio communication device 120 based on whether radio communication device 120 has received a radio signal including the identification information from radio communication terminal 121. By way of example, radio communicator 12 operates in the second mode (the position estimation mode) during step S130. At this point, estimation and identification apparatus 2 figures out which radio communication terminal 121 (whose radio communication terminal 121) is in the coverage area using radio communicator 12.

By way of example, radio communication device 120 that has no target T detected in its coverage area may be put to sleep in step S120 and the subsequent step S130. This reduces unnecessary interference and power consumption. As another example, radio communicator 12 may configure the directivity in a direction in which radio communication terminal 121 is assumed to be present, in step S130.

In step S140, in a case where storage 13 stores a result of the linking from the previous performance of the procedure in the flow chart, analyzer 14 unlinks the terminal from target T whose detected position is not included in the estimated presence range of the terminal.

In step S150, analyzer 14 links/unlinks radio communication terminal 121 with/from target T whose detected position is not included in the estimated presence range of the terminal based on the position, and ranks the link. Analyzer 14 may refer, as necessary, to the results of the linking and unlinking and the results of the ranking stored in storage 13 during the previous performance. At this point, for target T linked one-to-one, analyzer 14 figures out who target T is by the identification information and at which position target T is located with the resolution of the radar. The processing in step S150 will be described later with reference to FIG. 5.

In step S160, storage 13 stores the results of the linking and unlinking, and the results of the ranking. Referring to the results of the linking stored in storage 13 allows figuring out who target T is, and referring to the results of the ranking allows figuring out who target T is likely to be. The procedure is completed thereafter.

By way of example, the repetition may be performed at predetermined intervals. In another example, controller 10 may confirm that target T detected by tracker 11 in step S110 has moved to a predetermined position (e.g., a private locker) before proceeding the processing to step S120. Controller 10 may also confirm that target T detected by tracker 11 in step S110 is at a predetermined position (e.g., the entrance and exit of the room) before proceeding the processing to step S120. In this way, estimation and identification apparatus 2 can increase the probability of linking one-to-one between certain target T and radio communication terminal 121 worn by the certain target T when the certain target T moves away from another target T.

Figure 4A:
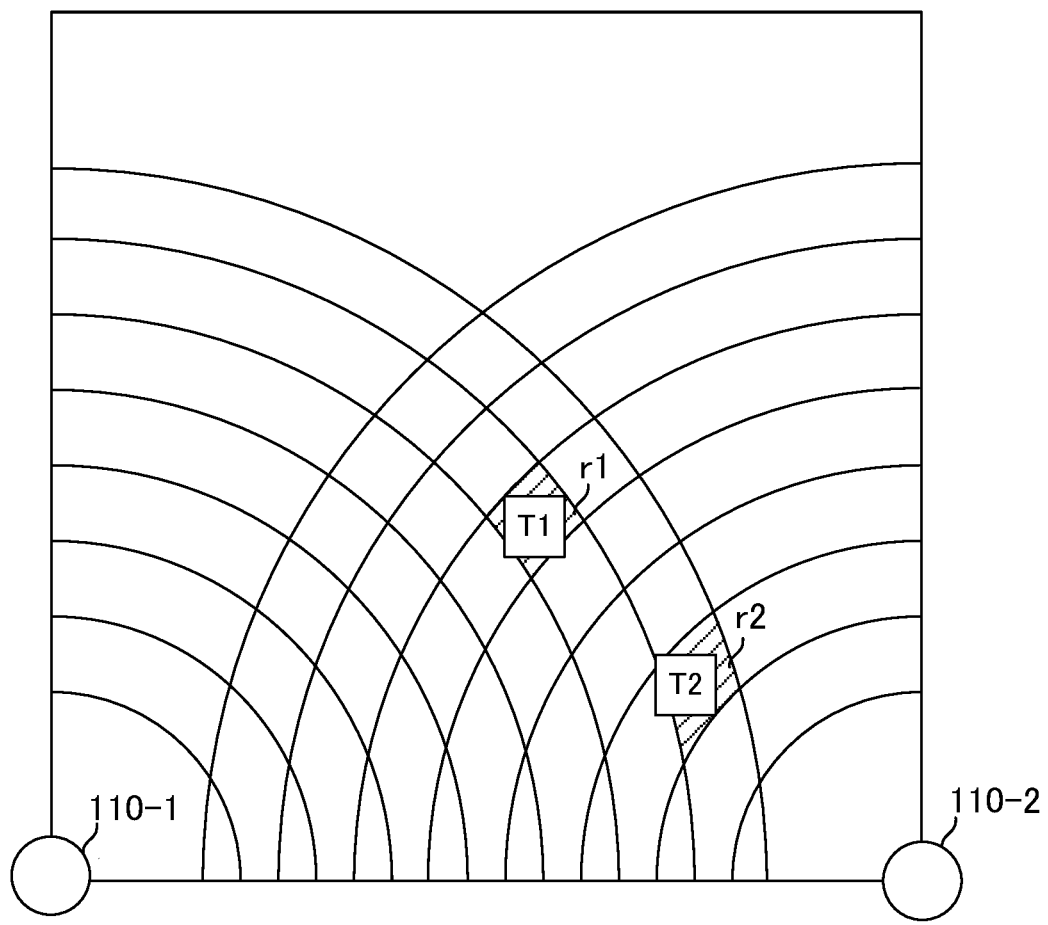
FIG. 4A illustrates a detection operation of tracking devices according to Embodiment 1.
Figure 4B:
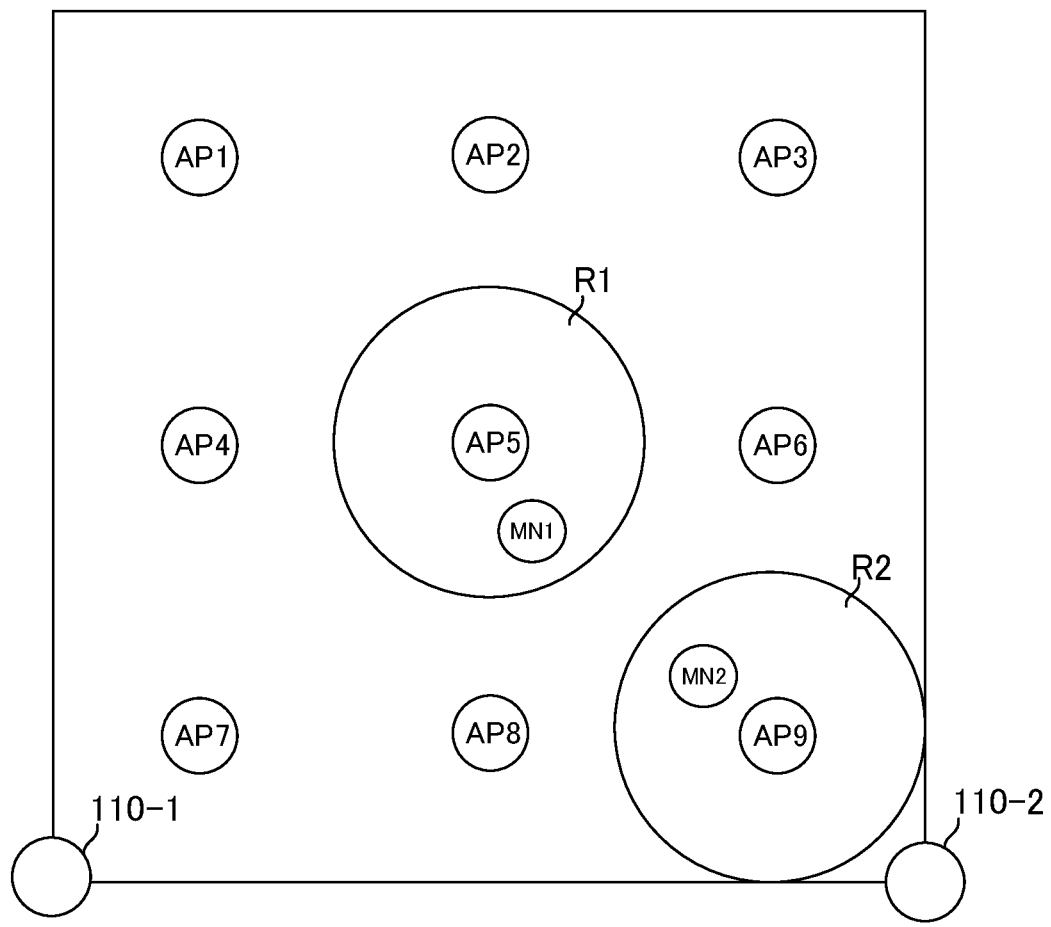
FIG. 4B illustrates an estimation operation of radio communication devices according to Embodiment 1.

FIG. 4A illustrates a detection operation of tracking devices 110 according to Embodiment 1. FIG. 4B illustrates an estimation operation of radio communication devices 120 according to Embodiment 1.

FIG. 4A illustrates that two tracking devices 110 (110-1 and 110-2), which are millimeter wave radars, detect locations of people (targets T1 and T2). The millimeter wave radars enable detection of positions r1 and r2 of targets T1 and T2 with the resolution of a few centimeters, for example.

FIG. 4B illustrates how locations of target T1 (e.g., JAMES) wearing radio communication terminal 121 (mobile node MN1) and target T2 (e.g., MARY) wearing radio communication terminal 121 (mobile node MN2) are estimated using radio communication devices 120 (AP1 to AP9). According to AP1 to AP9, it can be estimated that the position of mobile node MN1 worn by JAMES is included in coverage area R1 of AP5, and the position of mobile node MN2 worn by MARY is included in coverage area R2 of AP9, for example. However, it is difficult for AP1 to AP9 to estimate the positions of mobile node MN1 worn by JAMES and mobile node MN2 worn by MARY with as high resolution as the millimeter wave radars.

Figure 4C:
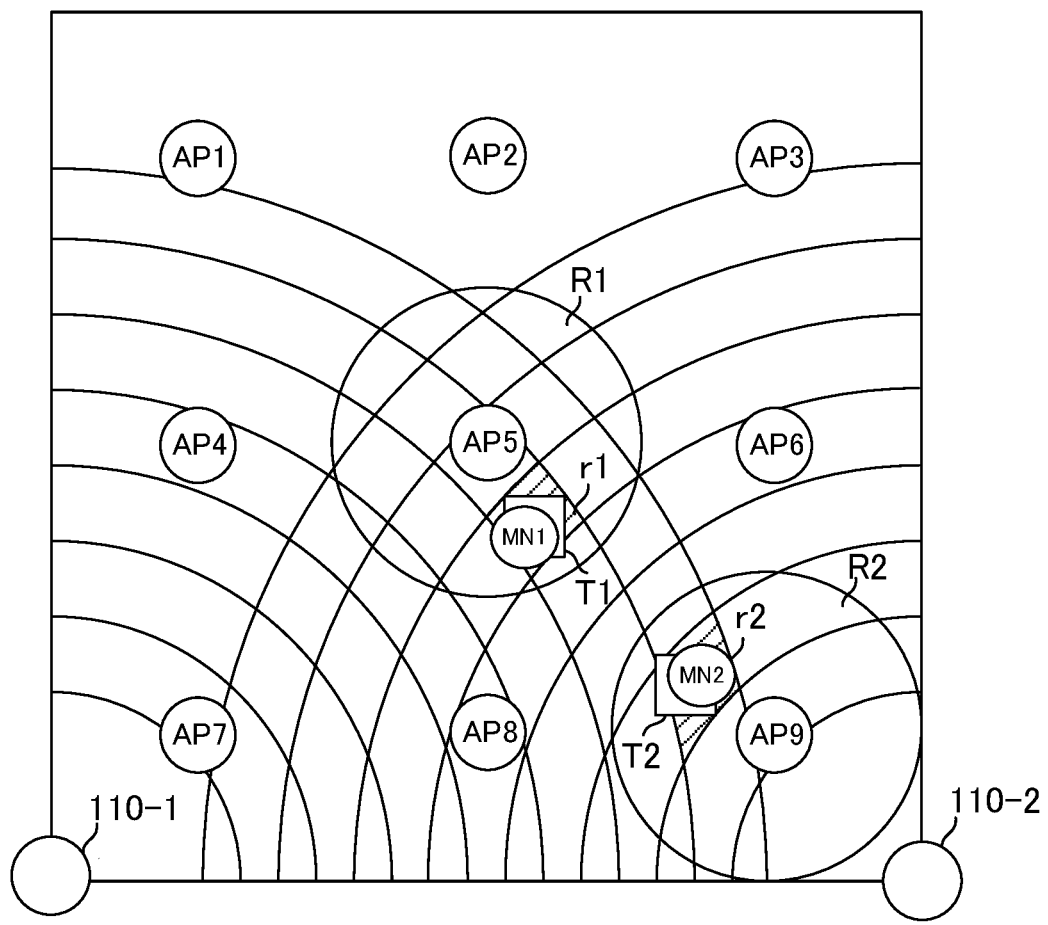
FIG. 4C illustrates an analysis operation of an analyzer according to Embodiment 1.

FIG. 4C illustrates an analysis operation of analyzer 14 according to Embodiment 1.

Using the fact that targets T1 and T2 hold mobile nodes MN1 and MN2 respectively, the detection results of tracking devices 110-1 and 110-2 (millimeter wave radars) can be combined with the estimation results of AP1 to AP9 (results estimated using RSSI, RSSI fingerprints, determination of whether radio communication is possible, etc.), as illustrated in FIG. 4C. The combination of such results allows identifying targets T1 and T2 as JAMES and MARY respectively, and estimating the positions of JAMES and MARY with a resolution higher than the resolution of position estimation by radio communication. Note that, although two tracking devices 110 (110-1 and 110-2) and nine radio communication devices 120 (AP1 to AP9) are illustrated in FIG. 4C, the numbers of tracking devices 110 and radio communication devices 120 are not limited thereto.

Figure 5:
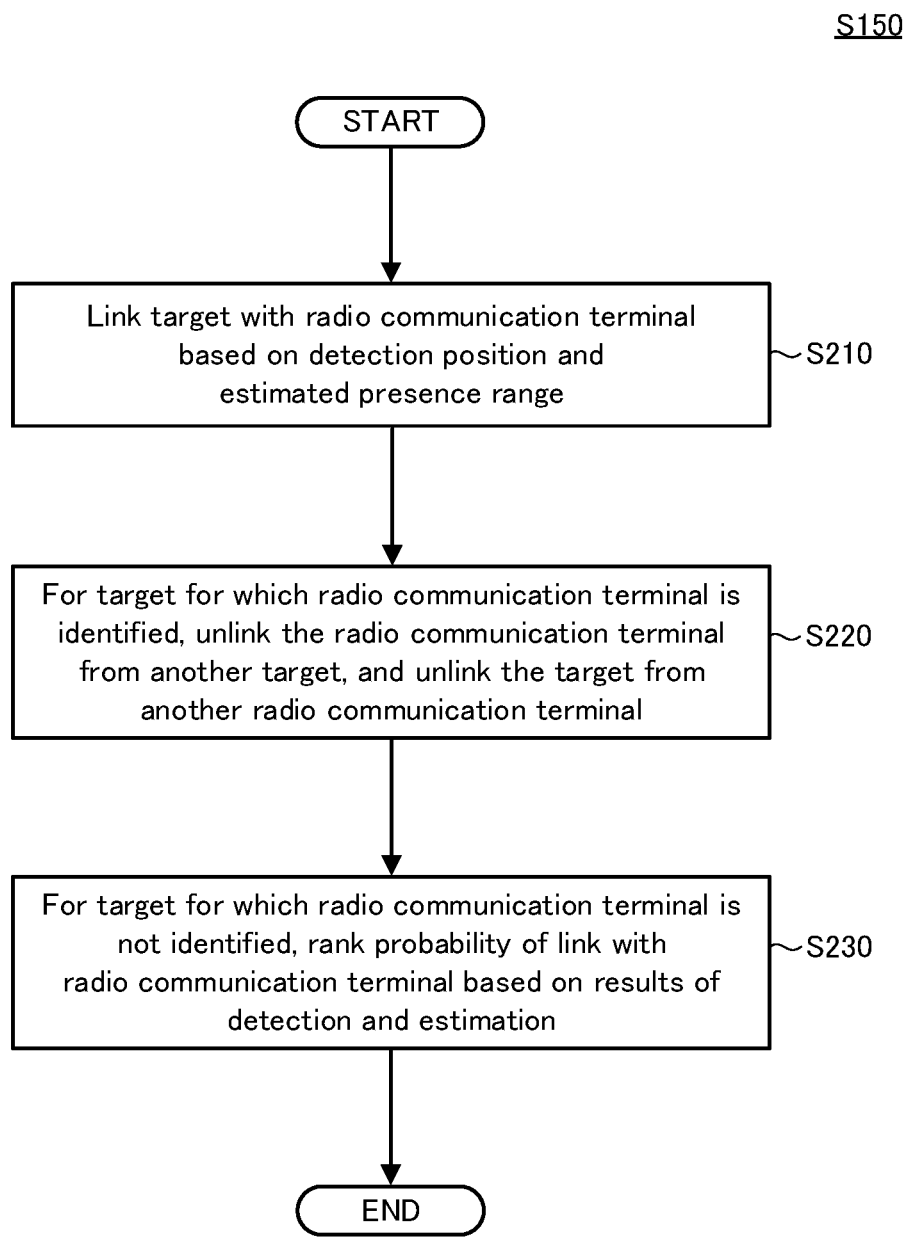
FIG. 5 is a flow chart describing an exemplary operation for step S150 in FIG. 3.

FIG. 5 is a flow chart describing an exemplary operation for step S150 in FIG. 3.

In step S210, analyzer 14 links target T with radio communication terminal 121 based on the position (the detection position) where target T is detected and the range (the estimated presence range) where radio communication terminal 121 is estimated to be present. The linking processing will be described later with reference to FIG. 6 and the subsequent figures.

For target T1 for which radio communication terminal 121-1 is identified, analyzer 14 unlinks radio communication terminal 121-1 from another target T2, and unlinks target T1 from another radio communication terminal 121-2 in step S220. Here, target T1 for which radio communication terminal 121-1 is identified is target T with which radio communication terminal 121 is linked one-to-one. The previous link is updated with the latest link in this manner.

In step S230, analyzer 14 ranks the probability of the links with radio communication terminal 121 based on the results of the detection and the estimation for targets T for which radio communication terminals 121 are not identified. By way of example, analyzer 14 weights the links between targets T for which radio communication terminals 121 are not identified and the terminals, in order to reflect the accuracy of the linking. Analyzer 14 then ranks, based on the weighting, radio communication terminals 121 respectively linked with targets T in the order of the probability of being held by respective targets T.

For example, analyzer 14 gives a score that reflects the accuracy of the linking to the links, and ranks the links based on the previous scores. For example, the higher the sum of the previous scores are, the higher the ranking is for the link.

Predetermined points corresponding to the linked time may be added to or subtracted from the previous scores. For example, predetermined points may be added to the latest score, and predetermined points may be subtracted from the score after a predetermined time has elapsed. In addition, predetermined points corresponding to the frequency may be added to or subtracted from the score. For example, more points may be added to the score for the link with high frequency of occurrence. Further, predetermined points corresponding to the detection position of target T may be added to or subtracted from the score. For example, the predetermined points may be added to the score when the detection position is where individuals are expected to be more easily identified (e.g., a private locker). This makes it possible to further improve the accuracy of individual estimation.

Furthermore, determination criteria for the linked time, the position, and the frequency of occurrence of the link described above may be based on, for example, a relation between a person (target T) and an object whose position is known. Examples of the relation include, for example, a relation about private lockers, a relation about individual desks and chairs, a relation about changing rooms and rest rooms, and a relation about places for handkerchiefs. Herein, the relation about private lockers includes that target T is likely to stop by his/her locker in the morning and before leaving for home, and that target T goes to the locker to pick up tools for a craft class. The relation about individual desks and chairs includes that target T is at his/her desk and chair during a class. The relation about changing rooms and rest rooms includes that boys use boys' room and girls use girls' room. The relation about places for handkerchiefs includes that target T frequently goes to a place for his/her handkerchief.

By way of example, tracker 11 measures physical characteristics (e.g., height and size) of target T, and behavioral characteristics (e.g., walking speed and arm swing) of target T. Analyzer 14 may add points to or subtract points from the score given to the links based on the physical or behavioral characteristics of targets T.

The processing ends after step S230.

[Basic Linking Operation]

In a case where targets T in a room each wear single radio communication terminal 121, the number of targets T matches the number of radio communication terminals 121 in the room. With this regard, a description will be given below of an operation of linking radio communication terminals 121 with the same number of targets T on a one-to-one basis (may be referred to as a "basic linking operation" for convenience) in step S210.

Figure 6:
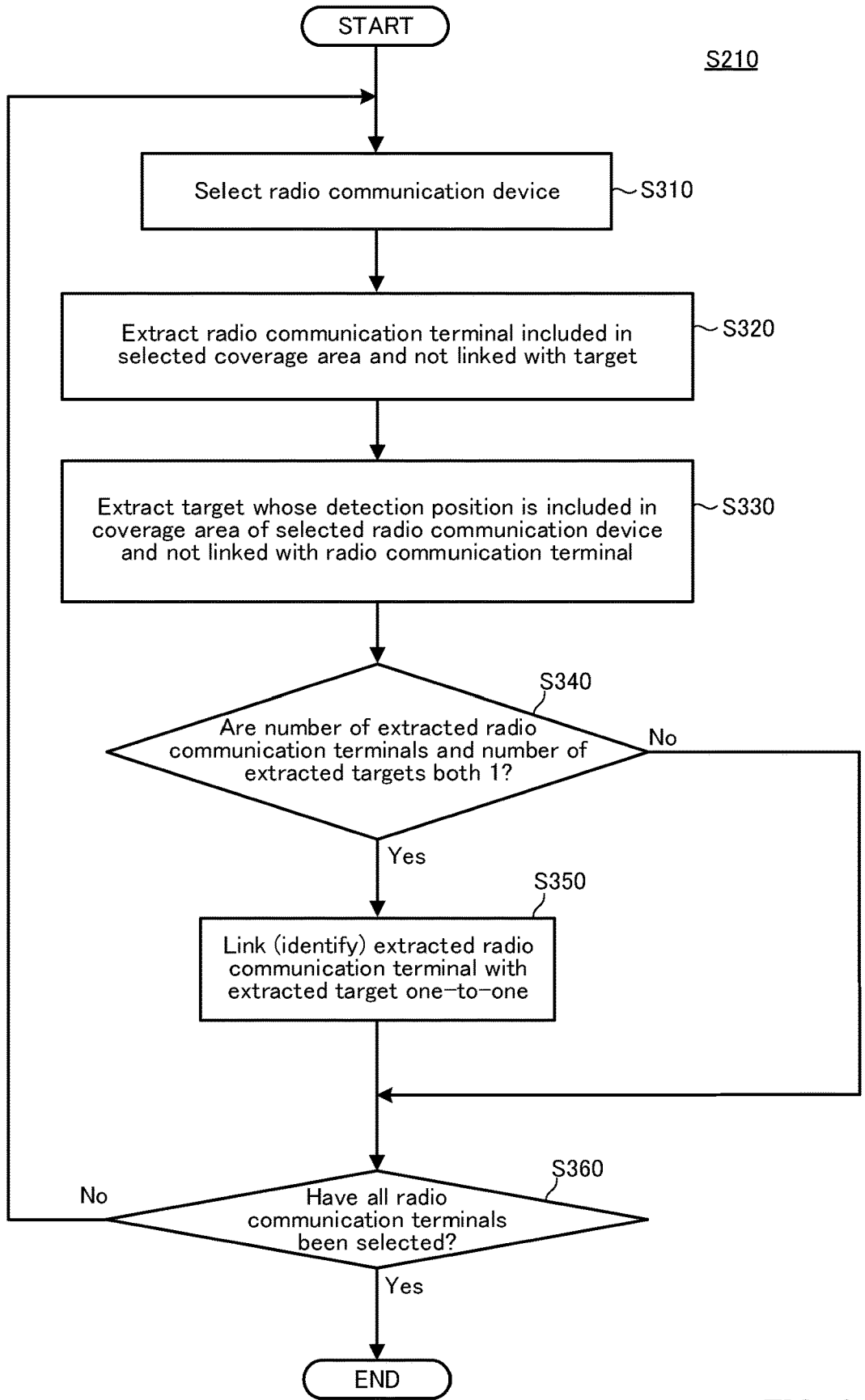
FIG. 6 is a flow chart describing an exemplary operation for step S210 in FIG. 5.

FIG. 6 is a flow chart describing an exemplary operation for step S210 in FIG. 5. In the exemplary operation for step S210, radio communication terminals 121 are linked one-to-one with targets T.

In step S310, analyzer 14 selects radio communication device 120 to be processed. In the exemplary operation illustrated in FIG. 6, analyzer 14 performs the linking operation for each coverage area of radio communication device 120.

In step S320, analyzer 14 extracts radio communication terminal 121 that is included in the coverage area of selected radio communication device 120, and not linked with any of targets T whose detection positions are included in the coverage area of selected radio communication device 120. Here, whether radio communication terminal 121 is included in the coverage are of radio communication device 120 is determined by analyzer 14 based on information received from radio communicator 12. The information indicates whether radio communication device 120 has received a radio signal (e.g., a radio signal including the identification information) from radio communication terminal 121.

In step S330, analyzer 14 extracts target T whose detection position is included in the coverage area of selected radio communication device 120, and not linked with any of radio communication terminals 121 in the coverage area of selected radio communication device 120.

In step S340, analyzer 14 determines whether the number of extracted radio communication terminals 121 and the number of extracted targets T are both equal to 1. That is, it is determined whether radio communication terminal 121 and target T are linked one-to-one.

When it is determined that the number of extracted radio communication terminals 121 and the number of extracted targets T are both equal to 1 (YES in step S340), analyzer 14 retains the existing links, and links extracted radio communication terminal 121 with extracted target T one-to-one in step S350, and the processing proceeds to step S360. Meanwhile, when it is determined that either the number of extracted radio communication terminals 121 or the number of extracted targets T is not equal to 1 (No in step S340), the existing links are retained and the processing proceeds to step S360.

In step S360, analyzer 14 determines whether all radio communication devices 120 have been selected. When it is determined that all radio communication devices 120 have not been selected (No in step S360), the processing proceeds to step S310, and analyzer 14 selects next radio communication device 120. The processing ends when analyzer 14 determines that all radio communication devices 120 have been selected (Yes in step S360). Note that, although it is assumed in FIG. 6 that a plurality of radio communication devices 120 are sequentially selected for the operations of S320 to S350, the operations of S320 to S350 may be simultaneously performed for the plurality of radio communication devices 120. Also, the termination condition of S360 may be whether all the radio communication terminals have been identified.

[Basic Linking Operation: One Target and One Terminal]

FIG. 7A illustrates an exemplary linking operation between target T1 and radio communication terminal 121 (mobile node MN1) in the flow chart in FIG. 6.

In FIG. 7A, single target T1 and single mobile node MN1 are present in coverage area R1 of AP1 that is radio communication device 120 selected in step S310 described in FIG. 6.

Herein, mobile node MN1 is not linked with target T1. Mobile node MN1 is thus extracted in step S320 described in FIG. 6.

Target T1 is also not linked with mobile node MN1. Target T1 is thus extracted in step S330 described in FIG. 6.

In this case, the number of extracted mobile node MN1 and the number of extracted target T1 are both equal to 1. Thus, target T1 and mobile node MN1 are linked one-to-one (identified) in step S350 described in FIG. 6.

[Basic Linking Operation: Three Targets and Three Terminals]

FIG. 7B illustrates an exemplary linking operation between targets T1, T2, and T3 and radio communication terminals 121 (mobile nodes MN1, MN2, and MN3) in the flow chart in FIG. 6.

In FIG. 7B, three targets T1, T2, and T3 and three mobile nodes MN1, MN2, and MN3 are present in coverage area R1 of AP1 that is radio communication device 120 selected in step S310 described in FIG. 6.

Herein, mobile nodes MN2 and MN3 have already been linked with targets T2 and T3 respectively, but mobile node MN1 is not linked with any of targets T1, T2, and T3. Mobile node MN1 is thus extracted in step S320 described in FIG. 6. Note that mobile nodes MN2 and MN3 are not extracted since they are already linked with targets T2 and T3 respectively.

In addition, target T1 is not linked with any of mobile nodes MN1, MN2, and MN3 while targets T2 and T3 are already linked with mobile nodes MN2 and MN3 respectively. Target T1 is thus extracted in step S330 described in FIG. 6. Targets T2 and T3 are not extracted since they are already linked with mobile nodes MN2 and MN3 respectively.

In this case, the number of extracted mobile node MN1 and the number of extracted target T1 are both equal to 1. Thus, target T1 and mobile node MN1 are linked with each other in step S350 described in FIG. 6. Other links are retained as they are.

<One-to-Many, Many-to-One, or Many-to-Many Linking>

In a case where targets T in a room each wear single mobile node MN, the number of targets T matches the number of mobile nodes MN in the room. When tracking device 110 is a radar, however, tracking device 110 may not be able to distinguish between target T1 and target T2 in proximity, for example, and may detect them as single target T. This sometimes causes that the number of mobile nodes MN for which the positions have been estimated does not match the number of targets T detected by tracking device 110. In this case, a plurality of targets T may be linked with a plurality of mobile nodes MN as necessary. With this regard, a description will be given below of an operation of linking mobile nodes MN with targets T on a one-to-one or many-to-one basis (may be referred to as an "extended linking operation" for convenience).

[Extended Linking Operation]

Figure 8:
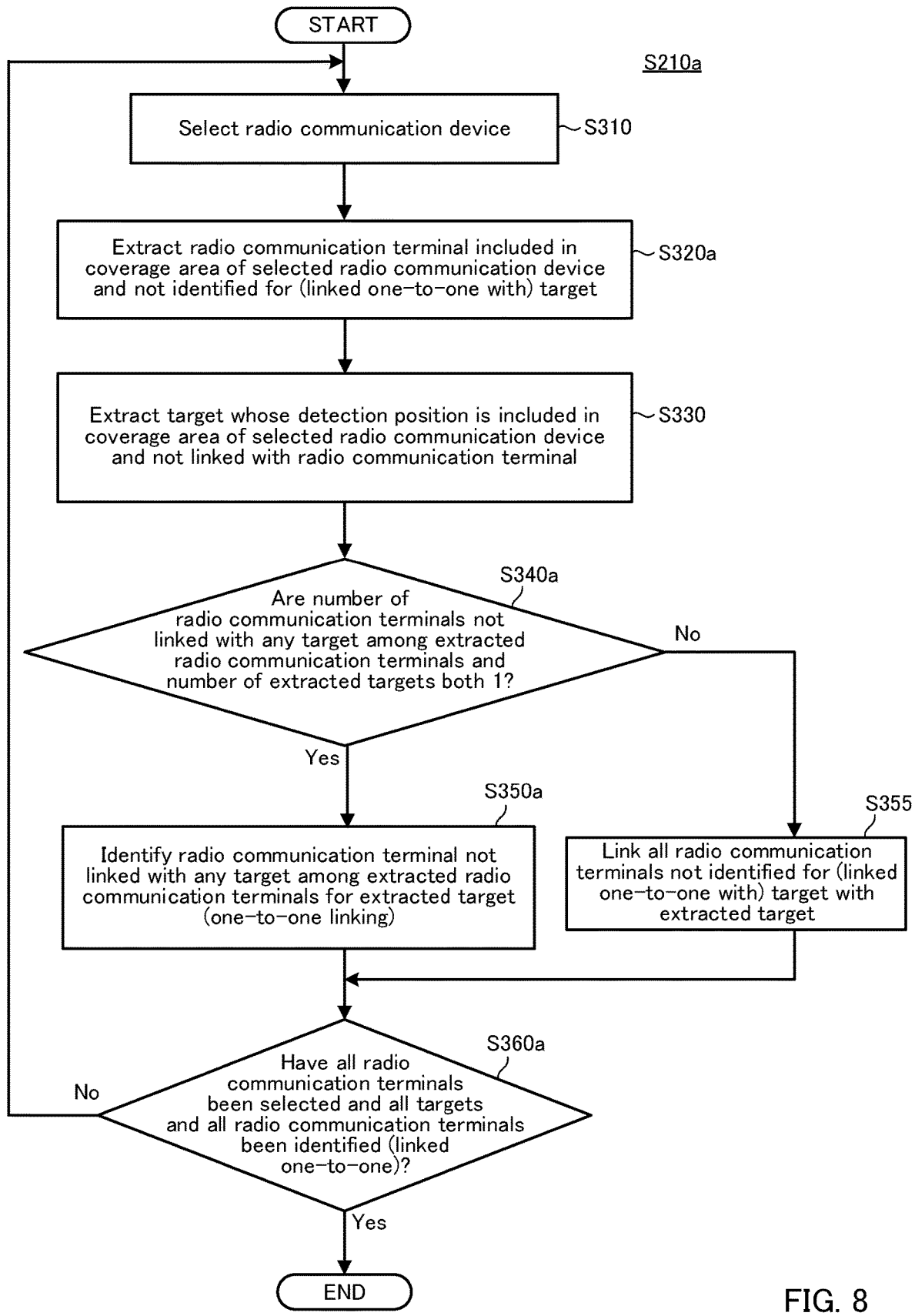
FIG. 8 is a flow chart describing another exemplary operation for step S210 in FIG. 5.

FIG. 8 is a flow chart describing another exemplary operation for step S210 in FIG. 5. In step S210a, which is another exemplary operation of step S210, mobile nodes MN are linked with targets T on a one-to-one or many-to-one basis.

The flow chart illustrated in FIG. 8 includes step S355 to be performed when either the number of extracted mobile nodes MN or the number of extracted targets T is not equal to 1. This part is different from the flow chart illustrated in FIG. 6. Other steps S310 and S330 are common to the flow chart illustrated in FIG. 6, and the descriptions are thus omitted.

In step S320a, analyzer 14 extracts radio communication terminals 121 that are included in the coverage area of selected radio communication device 120, and not identified for (linked one-to-one with) any of targets T whose detection positions are included in the coverage area of selected radio communication device 120. "Identified" here indicates the state where the target and the radio communication terminal (the mobile node) are linked one-to-one and it is determined who the target is.

In step S340a, analyzer 14 determines whether the number of radio communication terminals that are not linked with any of targets T among extracted radio communication terminals 121 and the number of extracted targets T are both equal to 1. That is, it is determined whether radio communication terminal 121 and target T can be linked one-to-one.

In step S350a, analyzer 14 retains existing links, and identifies the radio communication terminal that is not linked with any of the targets among extracted radio communication terminals 121 for extracted target T (one-to-one linking), and the processing proceeds to step S360.

In step S360a, analyzer 14 determines whether all radio communication devices 120 have been selected, and all the targets and all the radio communication terminals have been linked one-to-one. When it is determined that all radio communication devices 120 have not been selected, and that all the targets and all the radio communication terminals have not been linked one-to-one (No in step S360a), the processing proceeds to step S310, and analyzer 14 selects next radio communication device 120. The processing ends when analyzer 14 determines that all radio communication devices 120 have been selected, and that all the targets and all the radio communication terminals have been linked one-to-one (Yes in step S360a).

Note that, although it is assumed in FIG. 8 that a plurality of radio communication devices 120 are sequentially selected for the operations of S320 to S350, the operations of S320 to S350 may be simultaneously performed for the plurality of radio communication devices 120.

In step S355, analyzer 14 links mobile nodes MN that are not identified for (linked one-to-one with) targets T among mobile nodes MN in the coverage area of radio communication device 120 with extracted targets T. Herein, targets T to be determined in step S355 are targets T whose detection positions have been determined to be included in the coverage area of radio communication device 120 in step S310. Specific examples of the linking operation will be described below with reference to FIGS. 9A to 11F.

[Extended Linking Operation: One Target and Two Terminals]

FIG. 9A illustrates an exemplary linking operation between targets T1 and T2 and radio communication terminals 121 (mobile nodes MN1 and MN2) in the flow chart in FIG. 8.

In FIG. 9A, single target T1 and two mobile nodes MN1 and MN2 are present in coverage area R1 of AP1 that is radio communication device 120 selected in step S310 described in FIG. 8.

Here, neither of mobile nodes MN1 nor MN2 is linked with target T1. Mobile nodes MN1 and MN2 are thus extracted in step S320a described in FIG. 8.

In addition, target T1 is not linked with any of mobile nodes MN1 and MN2. Target T1 is thus extracted in step S330 described in FIG. 8.

In this case, the number of extracted mobile nodes MN1 and MN2 is not equal to 1 but is 2, and the number of mobile nodes that are not linked with any target is not 1. Thus, in step S355 described in FIG. 8, mobile nodes MN1 and MN2 that are included in coverage area R1 of AP1 being selected radio communication device 120 and that are not linked one-to-one with target T1 are all linked with extracted target T1.

[Extended Linking Operation: Two Targets and Two Terminals]

FIG. 9B illustrates an exemplary linking operation between targets T1 and T2 and radio communication terminals 121 (mobile nodes MN1 and MN2) in the flow chart in FIG. 8.

In FIG. 9B, two targets T1 and T2 and two mobile nodes MN1 and MN2 are present in coverage area R1 of AP1 that is radio communication device 120 selected in step S310 described in FIG. 8.

Herein, mobile nodes MN1 and MN2 are not linked one-to-one with any of targets T1 and T2. Mobile nodes MN1 and MN2 are thus extracted in step S320a described in FIG. 8.

In addition, targets T1 and T2 are not linked with any of mobile nodes MN1 and MN2. Targets T1 and T2 are thus extracted in step S330 described in FIG. 8.

In this case, the number of extracted mobile nodes MN1 and MN2 is not equal to 1 but is 2, and the number of mobile nodes that are not linked with any target is not 1. Thus, in step S355 described in FIG. 8, mobile nodes MN1 and MN2 that are included in coverage area R1 of selected AP1 and not linked one-to-one with target T1 or T2 are all linked with each of extracted targets T1 and T2.

FIG. 9C illustrates still another exemplary linking operation between targets T1 and T2 and radio communication terminals 121 (mobile nodes MN1 and MN2) in the flow chart in FIG. 8.

In FIG. 9C, two targets T1 and T2 and two mobile nodes MN1 and MN2 are present in coverage area R1 of AP1 that is radio communication device 120 selected in step S310 described in FIG. 8.

Herein, mobile node MN2 has already been linked one-to-one with target T2, but mobile node MN1 is not linked with any of targets T1 and T2. Mobile node MN1 is thus extracted in step S320a described in FIG. 8. Note that mobile node MN2 is not extracted since it is already linked one-to-one with target T2.

In addition, target T1 is not linked with any of mobile nodes MN1 and MN2 while target T2 has already been linked with mobile node MN2. Target T1 is thus extracted in step S330 described in FIG. 8. Target T2 is not extracted since it is already linked with mobile node MN2.

In this case, the number of mobile mode MN1 that is not linked with any target among the extracted mobile node MN and the number of extracted target T1 are both equal to 1. Thus, target T1 and mobile node MN1 are linked one-to-one (identified) in step S350a described in FIG. 8. The other link is retained as it is.

[Extended Linking Operation: Two Targets and Three Terminals]

FIG. 10A illustrates still another exemplary linking operation between targets T1 and T2 and radio communication terminals 121 (mobile nodes MN1, MN2, and MN3) in the flow chart in FIG. 8.

In FIG. 10A, two targets T1 and T2 and three mobile nodes MN1, MN2, and MN3 are present in coverage area R1 of AP1 that is radio communication device 120 selected in step S310 described in FIG. 8.

Herein, mobile nodes MN1, MN2 and MN3 are not linked one-to-one with any of targets T1 and T2. Mobile nodes MN1, MN2, and MN3 are thus extracted in step S320a described in FIG. 8.

In addition, targets T1 and T2 are not linked with any of mobile nodes MN1, MN2, and MN3. Targets T1 and T2 are thus extracted in step S330 described in FIG. 8.

In this case, the number of extracted mobile nodes MN1, MN2, and MN3 is not equal to 1 but is 3, and the number of mobile nodes that are not linked with any target is not 1. Thus, in step S355 described in FIG. 8, mobile nodes MN1, MN2 and MN3 that are included in coverage area R1 of selected AP1 and not linked one-to-one with target T1 or T2 are all linked with each of extracted targets T1 and T2.

FIG. 10B illustrates still another exemplary linking operation between targets T1 and T2 and radio communication terminals 121 (mobile nodes MN1, MN2, and MN3) in the flow chart in FIG. 8.

In FIG. 10B, two targets T1 and T2 and three mobile nodes MN1, MN2, and MN3 are present in coverage area R1 of AP1 that is radio communication device 120 selected in step S310 described in FIG. 8.

Herein, mobile node MN3 has already been linked one-to-one with target T2, but mobile nodes MN1 and MN2 are not linked one-to-one with any of targets T1 and T2. Mobile nodes MN1 and MN2 are thus extracted in step S320a described in FIG. 8. Note that mobile node MN3 is not extracted since it is linked one-to-one with target T2.

In addition, target T1 is not linked with any of mobile nodes MN1, MN2, and MN3 while target T2 has already been linked with mobile node MN3. Target T1 is thus extracted in step S330 described in FIG. 8. Note that target T2 is not extracted since it is already linked with mobile node MN3.

In this case, the number of extracted mobile nodes MN1 and MN2 is not equal to 1 but is 2, and the number of mobile nodes that are not linked with any target is not 1. Thus, in step S355 described in FIG. 8, mobile nodes MN1 and MN2 that are included in coverage area R1 of selected AP1 and not linked one-to-one with target T1 or T2 are all linked with extracted target T1. The other link is retained as it is.

FIG. 10C illustrates still another exemplary linking operation between targets T1 and T2 and radio communication terminals 121 (mobile nodes MN1, MN2, and MN3) in the flow chart in FIG. 8.

In FIG. 10C, two targets T1 and T2 and three mobile nodes MN1, MN2, and MN3 are present in coverage area R1 of AP1 that is radio communication device 120 selected in step S310 described in FIG. 8.

Herein, mobile nodes MN2 and MN3 have been both linked with target T2, but mobile node MN1 is not linked with any of targets T1 and T2. Mobile nodes MN1, MN2, and MN3 are thus extracted in step S320a described in FIG. 8.

In addition, target T1 is not linked with any of mobile nodes MN1, MN2, and MN3 while target T2 has already been linked with mobile nodes MN2 and MN3. Target T1 is thus extracted in step S330 described in FIG. 8. Target T2 is not extracted since it is already linked with mobile nodes MN2 and MN3.

In this case, the number of mobile node MN1 that is not linked with any target among extracted mobile nodes MN1, MN2, and MN3 and the number of extracted target T1 are both equal to 1, and thus target T1 and mobile node MN1 are linked with each other in step S350a described in FIG. 8. The other links are retained as they are.

[Extended Linking Operation: Three Targets and Three Terminals]

FIG. 11A illustrates still another exemplary linking operation between targets T1, T2, and T3 and radio communication terminals 121 (mobile nodes MN1, MN2, and MN3) in the flow chart in FIG. 8.

In FIG. 11A, three targets T1, T2, and T3 and three mobile nodes MN1, MN2, and MN3 are present in coverage area R1 of AP1 that is radio communication device 120 selected in step S310 described in FIG. 8.

Herein, mobile nodes MN1, MN2 and MN3 are not linked one-to-one with any of targets T1, T2, and T3. Mobile nodes MN1, MN2, and MN3 are thus extracted in step S320a described in FIG. 8.

In addition, targets T1, T2, and T3 are not linked with any of mobile nodes MN1, MN2, and MN3. Targets T1, T2, and T3 are thus extracted in step S330 described in FIG. 8.

In this case, the number of extracted mobile nodes MN1, MN2, and MN3 is not equal to 1 but is 3, and the number of mobile nodes that are not linked with any target is not 1. Thus, in step S355 described in FIG. 8, mobile nodes MN1, MN2 and MN3 that are included in coverage area R1 of selected AP1 and not linked one-to-one with target T1, T2 or T3 are all linked with each of extracted targets T1, T2, and T3.

FIG. 11B illustrates still another exemplary linking operation between targets T1, T2, and T3 and radio communication terminals 121 (mobile nodes MN1, MN2, and MN3) in the flow chart in FIG. 8.

In FIG. 11B, three targets T1, T2, and T3 and three mobile nodes MN1, MN2, and MN3 are present in coverage area R1 of AP1 that is radio communication device 120 selected in step S310 described in FIG. 8.

Herein, mobile node MN3 has already been linked one-to-one with target T3, but mobile nodes MN1 and MN2 are not linked with any of targets T1, T2, and T3. Mobile nodes MN1 and MN2 are thus extracted in step S320*a* described in FIG. 8. Note that mobile node MN3 is not extracted since it is linked one-to-one with target T3.

In addition, targets T1 and T2 are not linked with any of mobile nodes MN1, MN2, and MN3 while target T3 has already been linked with mobile node MN3. Targets T1 and T2 are thus extracted in step S330 described in FIG. 8. Note that target T3 is not extracted since it is already linked with mobile node MN3.

In this case, the number of extracted mobile nodes MN1 and MN2 is not equal to 1 but is 2 and the number of mobile nodes that are not linked with any target is not 1. Thus, in step S355 described in FIG. 8, mobile nodes MN1 and MN2 that are included in coverage area R1 of selected AP1 and not linked one-to-one with target T1, T2, or T3 are all linked with extracted targets T1 and T2. The other link is retained as it is.

FIG. 11C illustrates still another exemplary linking operation between targets T1, T2, and T3 and radio communication terminals 121 (mobile nodes MN1, MN2, and MN3) in the flow chart in FIG. 8.

In FIG. 11C, three targets T1, T2, and T3 and three mobile nodes MN1, MN2, and MN3 are present in coverage area R1 of AP1 that is radio communication device 120 selected in step S310 described in FIG. 8.

Herein, mobile nodes MN2 and MN3 have already been linked one-to-one with targets T2 and T3 respectively, but mobile node MN1 is not linked with any of targets T1, T2, and T3. Mobile node MN1 is thus extracted in step S320*a* described in FIG. 8. Note that mobile nodes MN2 and MN3 are not extracted since they are already linked one-to-one with targets T2 and T3 respectively.

In addition, targets T2 and T3 have already been linked with mobile nodes MN2 and MN3 respectively, but target T1 is not linked with any of mobile nodes MN1, MN2, and MN3. Target T1 is thus extracted in step S330 described in FIG. 8. Note that targets T2 and T3 are not extracted since they are already linked with mobile nodes MN2 and MN3 respectively.

In this case, the number of mobile mode that is not linked with any target among extracted mobile node MN1 and the number of extracted target T1 are both equal to 1. Thus, target T1 and mobile node MN1 are linked with each other in step S350*a* described in FIG. 8. The other links are retained as they are.

FIG. 11D illustrates still another exemplary linking operation between targets T1, T2, and T3 and radio communication terminals 121 (mobile nodes MN1, MN2, and MN3) in the flow chart in FIG. 8.

In FIG. 11D, three targets T1, T2, and T3 and three mobile nodes MN1, MN2, and MN3 are present in coverage area R1 of AP1 that is radio communication device 120 selected in step S310 described in FIG. 8.

Herein, both mobile nodes MN2 and MN3 have already been linked with target T3, but mobile node MN1 is not linked one-to-one with any of targets T1, T2, and T3. Mobile nodes MN1, MN2, and MN3 are thus extracted in step S320*a* described in FIG. 8.

In addition, targets T1 and T2 are not linked with any of mobile nodes MN1, MN2, and MN3 while target T3 has already been linked with mobile nodes MN2 and MN3. Targets T1 and T2 are thus extracted in step S330 described in FIG. 8. Note that target T3 is not extracted since it is already linked with mobile nodes MN2 and MN3.

In this case, the number of extracted targets T1 and T2 is not equal to 1 but is 2, and the number of mobile nodes that are not linked one-to-one with any target is not 1.

Thus, in step S355 described in FIG. 8, mobile nodes MN1, MN2 and MN3 that are included in coverage area R1 of selected AP1 and not linked one-to-one with target T1, T2, or T3 are all linked with each of extracted targets T1 and T2. The other links are retained as they are.

FIG. 11E illustrates still another exemplary linking operation between targets T1, T2, and T3 and radio communication terminals 121 (mobile nodes MN1, MN2, and MN3) in the flow chart in FIG. 8.

In FIG. 11E, three targets T1, T2, and T3 and three mobile nodes MN1, MN2, and MN3 are present in coverage area R1 of AP1 that is radio communication device 120 selected in step S310 described in FIG. 8.

Herein, all mobile nodes MN1, MN2, and MN3 have already been linked with target T3, but are not linked one-to-one. Mobile nodes MN1, MN2, and MN3 are thus extracted in step S320*a* described in FIG. 8.

In addition, targets T1 and T2 are not linked with any of mobile nodes MN1, MN2, and MN3 while target T3 has already been linked with mobile nodes MN1, MN2 and MN3. Targets T1 and T2 are thus extracted in step S330 described in FIG. 8. Note that target T3 is not extracted since it is already linked with mobile nodes MN1, MN2 and MN3.

In this case, the number of extracted mobile nodes is not equal to 1 but is 3, and the number of mobile nodes that are not linked with any target is not 1. Thus, in step S355 described in FIG. 8, mobile nodes MN1, MN2 and MN3 that are included in coverage area R1 of selected AP1 and not linked one-to-one with target T1, T2, or T3 are all linked with each of extracted targets T1 and T2. The other links are retained as they are.

FIG. 11F illustrates still another exemplary linking operation between targets T1, T2, and T3 and radio communication terminals 121 (mobile nodes MN1, MN2, and MN3) in the flow chart in FIG. 8.

In FIG. 11F, three targets T1, T2, and T3 and three mobile nodes MN1, MN2, and MN3 are present in coverage area R1 of AP1 that is radio communication device 120 selected in step S310 described in FIG. 8.

Herein, all mobile nodes MN1, MN2, and MN3 have already been linked with target T3, but are not linked one-to-one. Mobile nodes MN1, MN2, and MN3 are thus extracted in step S320*a* described in FIG. 8.

In addition, target T1 is not linked with any of mobile nodes MN1, MN2, and MN3 while target T2 has already been linked with mobile nodes MN1 and MN2, and target T3 has already been linked with mobile nodes MN1, MN2 and MN3. Target T1 is thus extracted in step S330 described in FIG. 8. Target T2 and target T3 are not extracted since they both have linked mobile nodes.

In this case, the number of extracted mobile nodes is not equal to 1 but is 3, and the number of mobile nodes that are not linked with any target is not 1. Thus, in step S355 described in FIG. 8, mobile nodes MN1, MN2, and MN3 that are included in coverage area R1 of selected AP1 and not linked one-to-one with target T1, T2, or T3 are all linked with extracted target T1. The other links are retained as they are.

Note that descriptions of the specific examples described above are based on the assumption that people in the room all wear radio communication terminals 121. A similar linking operation can be performed, however, even when people not wearing radio communication terminal 121 are mixed in the room. In this case, it can be assumed, for example, that single target T1 and single mobile node MN1 are present in the coverage area of AP1 and target T1 is identified, but a person (target T1) holding mobile node MN1 (radio communication terminal 121) and a person (target T2) not holding a mobile node are both identified as target T1.

Further, in this case, target T1 that has been identified once possibly separates into two targets T1 and T2. The following operation may be applied in such a situation. First, mobile node MN1 is linked with both of separated two targets T1 and T2, and when target T2 among separated two targets T1 and T2 is away from the coverage area and target T1 stays in the coverage area, mobile node MN1 is identified for target T1 and target T2 is unlinked from mobile node MN1.

Embodiment 2

Estimation and identification apparatus 2 according to Embodiment 1 combines the detection position of target T and the estimated presence range of radio communication terminal 121. In Embodiment 2, however, a detection velocity of target T is also combined in addition to the detection position of target T and the estimated presence range of radio communication terminal 121. Tracker 11 of estimation and identification apparatus 2 according to Embodiment 2 includes a configuration for detecting a velocity and a moving direction of target T. Radio communicator 12 and radio communication terminal 121 according to Embodiment 2 include a function of estimating a velocity and a moving direction. Note that the accuracy of estimating the velocity and the moving direction of radio communication terminal 121 by radio communicator 12 and radio communication terminal 121 according to Embodiment 2 need not be equal to the accuracy of detecting the position and the moving direction of target T by tracker 11 of estimation and identification apparatus 2 according to Embodiment 2.

Figure 12:
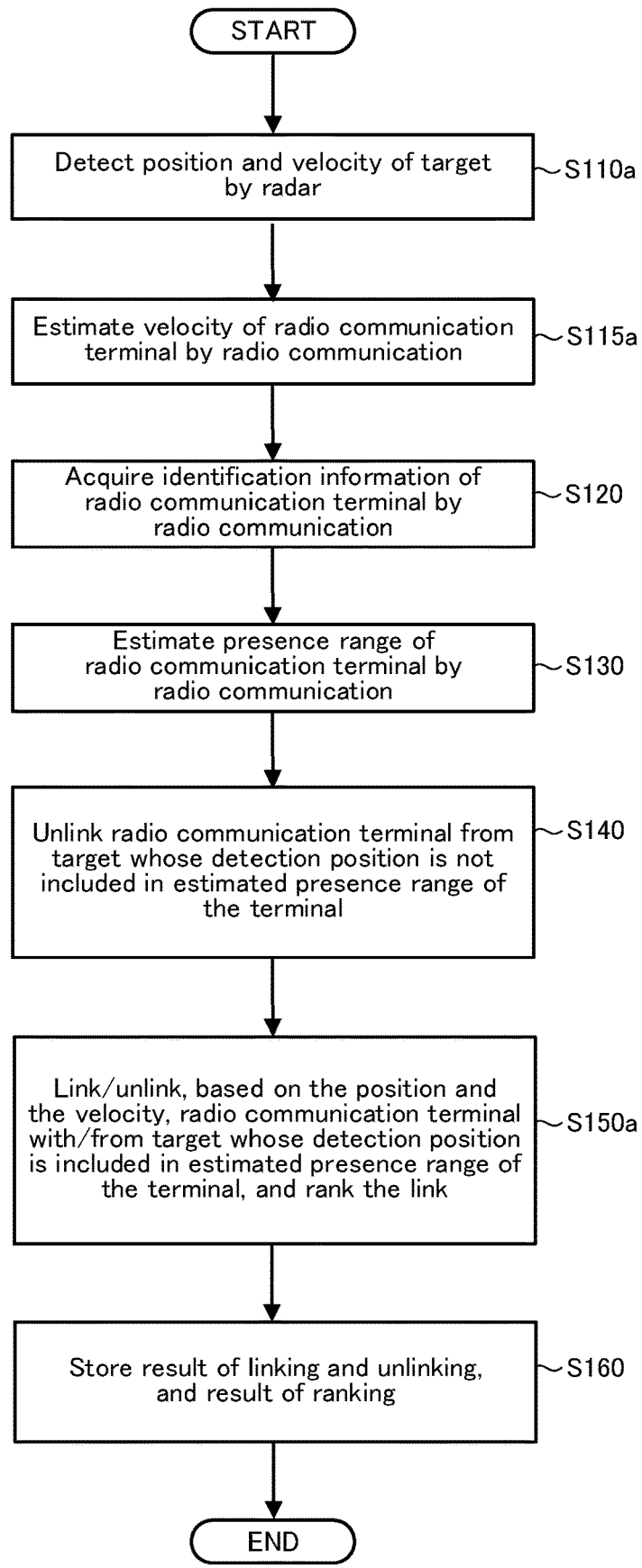
FIG. 12 is a flow chart describing an exemplary operation of an estimation and identification apparatus according to Embodiment 2.

FIG. 12 is a flow chart describing an exemplary operation of estimation and identification apparatus 2 according to Embodiment 2. Steps S110a, S115a, and S150a are different from the steps in the flow chart described in FIG. 3. Descriptions for the other steps will be omitted.

In step S110a, tracker 11 detects the position and the velocity (detection velocity) of target T by a radar. The detection velocity is represented by a velocity vector. Tracker 11 may use a plurality of radars of a plurality of tracking devices 110, and determine the direction of the detection velocity based on the difference in the velocity of target T measured from different directions. Tracker 11 may also measure target T twice with a predetermined interval using a single radar of tracking device 110, and determine the direction of the detection velocity based on the difference in the measurements.

Figure 13A:
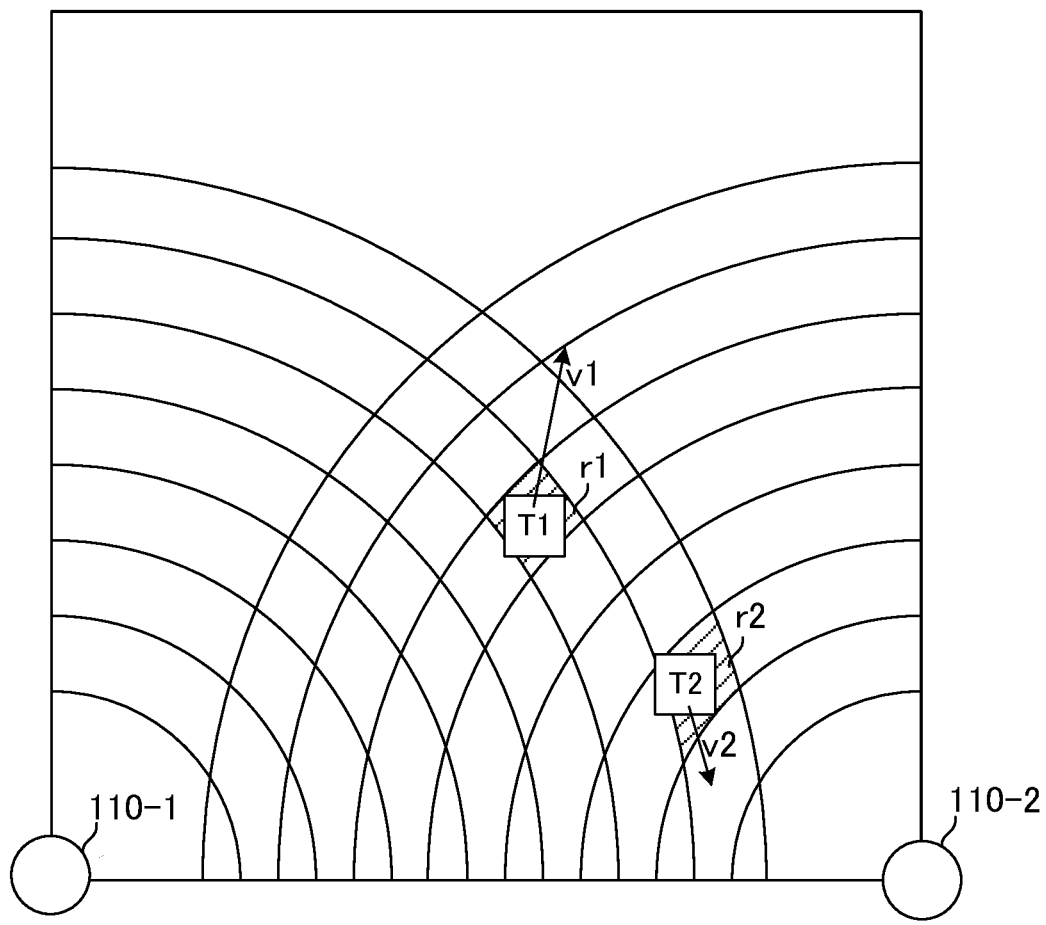
FIG. 13A illustrates a detection operation of tracking devices according to Embodiment 2.

FIG. 13A illustrates a detection operation of tracking devices 110 according to Embodiment 2. In addition to the detection operation illustrated in FIG. 4A, velocity vectors v1 and v2 of targets T1 and T2 are detected.

Referring back to FIG. 12, in step S115a, radio communicator 12 acquires the velocity (the estimated velocity) or a velocity component (an estimated velocity component) of radio communication terminal 121 by radio communication. For example, specific radio communication device 120 performs transmission, and certain radio communication terminal 121 measures RSSI twice or more with predetermined intervals. The measured RSSI increases as radio communication terminal 121 approaches specific radio communication device 120. The measured RSSI decreases as radio communication terminal 121 moves away from specific radio communication device 120. Analyzer 14 calculates the velocity component of radio communication terminal 121 in the direction of radio communication device 120 based on the variation of the measured RSSI and the predetermined intervals.

Figure 13B:
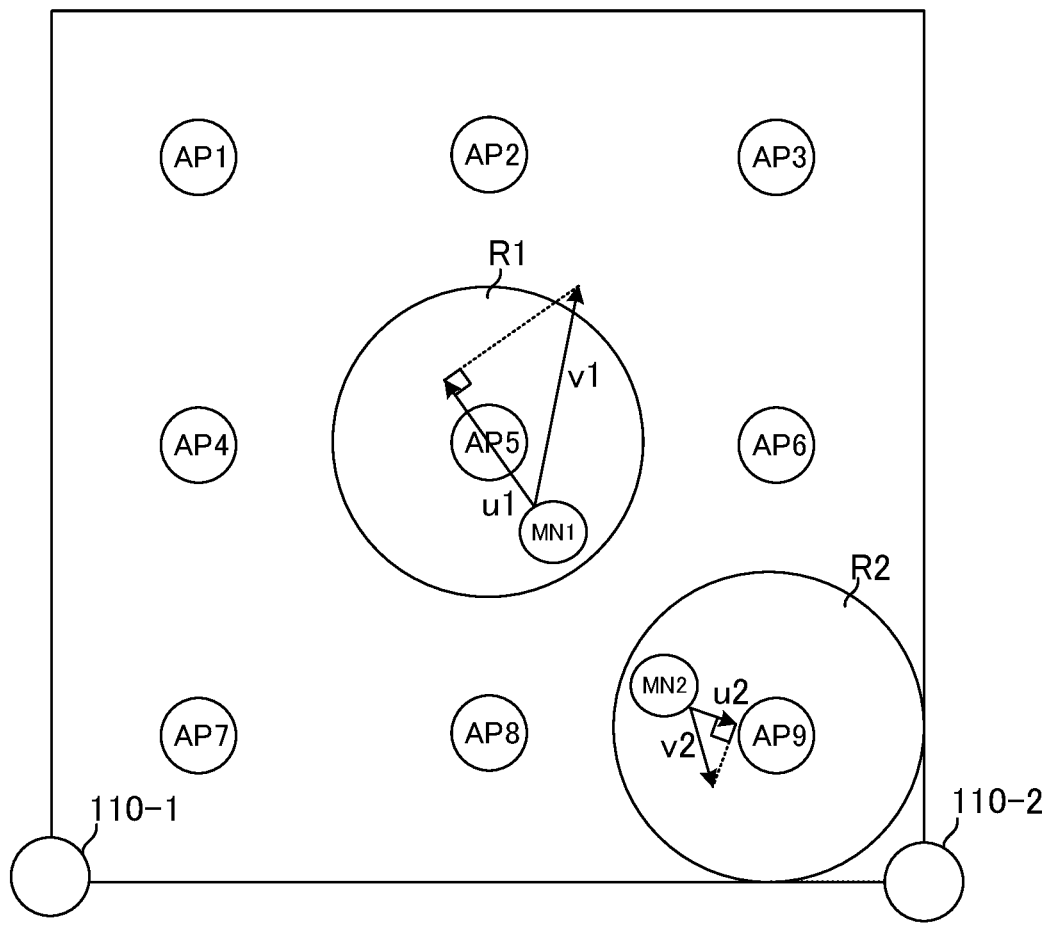
FIG. 13B illustrates an estimation operation of radio communication devices according to Embodiment 2.

FIG. 13B illustrates an estimation operation of radio communication devices 120 according to Embodiment 2. In addition to the estimation operation illustrated in FIG. 4B, vectors u1 and u2 indicating the velocity components of mobile nodes MN1 and MN2 in the directions of AP5 and AP9 are detected.

Depending on a propagation environment of radio waves in radio communication, the measured RSSI does not necessarily increase when radio communication terminal 121 moves toward specific radio communication device 120. Likewise, the measured RSSI does not necessarily decrease when radio communication terminal 121 moves away from specific radio communication device 120.

Thus, by way of example, the variation in RSSI measured by radio communication terminal 121 with respect to the position and the moving direction of radio communication terminal 121 is measured for each radio communication device 120 in advance. A map for a set of the RSSI variations (vector fingerprints) is prepared based on the measurement result from the position and the moving direction of radio communication terminal 121.

In use of estimation and identification system 1, analyzer 14 may compare the variation in the RSSI measured by radio communication terminal 121 with the vector fingerprints to estimate the position and the velocity of radio communication terminal 121. In this case, each radio communication device 120 need not have a directivity. Additionally, radio communicator 12 may include a single or a plurality of radio communication devices 120 with a plurality of antennas (not illustrated) in place of the plurality of radio communication devices 120.

When radio communicator 12 has a directivity, radio communicator 12 can more accurately measure the velocity (or the velocity component) of radio communication terminal 121 by measuring the moving direction of radio communication terminal 121 using the directivity.

Referring back to FIG. 12, in step S150a, analyzer 14 links/unlinks radio communication terminal 121 with/from target T whose detected position is not included in the estimated presence range of the terminal based on the position and the velocity, and ranks the links. The linking is performed based on the detection velocity and the estimated velocity (or the estimated velocity component) in addition to the detection position. This is different from step S150 described in FIG. 3. To be more specific, radio communication terminal 121 with a difference between the detection velocity and the estimated velocity (or a difference between the component of the detection velocity in the direction of radio communication device 120 and the estimated velocity) greater than a predetermined threshold is excluded from the linking targets. A description of the processing common to step S150 described in FIG. 3 will be omitted.

Figure 13C:
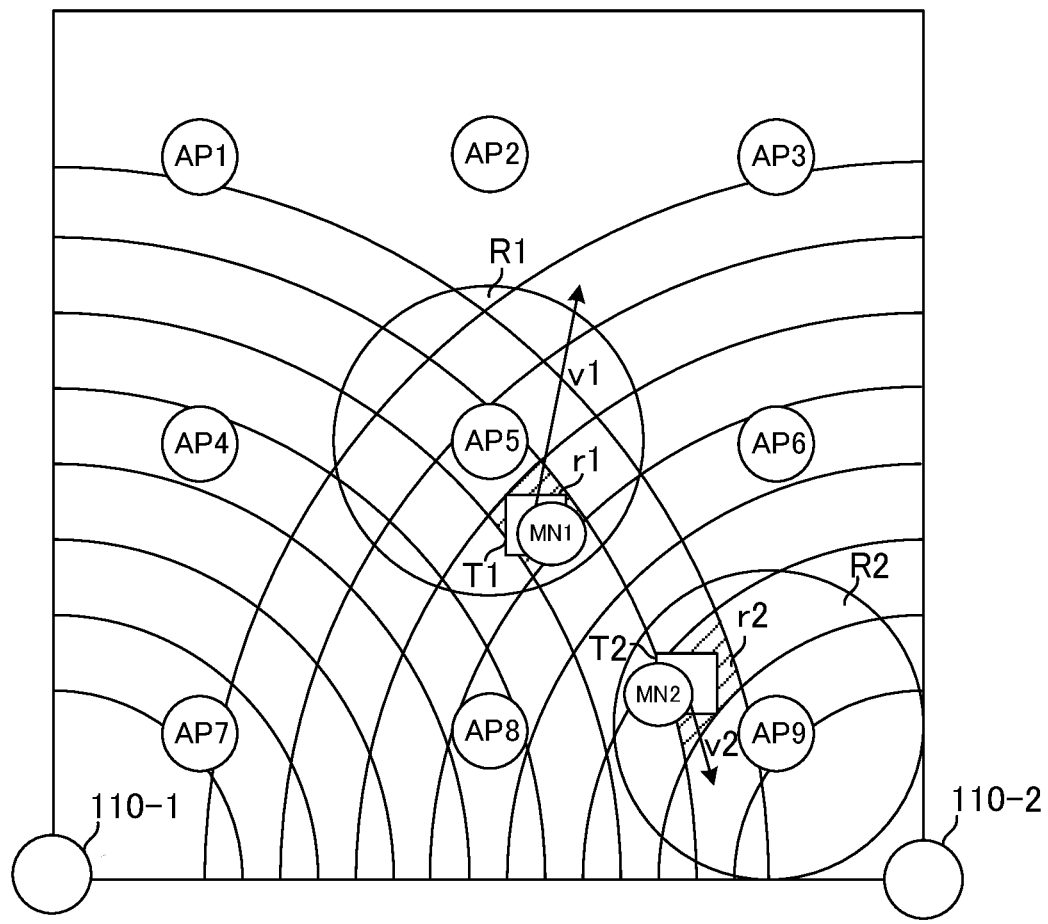
FIG. 13C illustrates combinations of detection results and estimation results according to Embodiment 2.

FIG. 13C illustrates combinations of detection results and estimation results according to Embodiment 2. In addition to the estimation operation illustrated in FIG. 4C, the detection results of velocity vectors v1 and v2 of mobile nodes MN1 and MN2 can be combined.

In the present embodiment, the use of position information and velocity information enables more accurate identification of the targets and the radio communication terminals.

Further, the addition of the velocity information allows figuring out which target holds which radio communication terminal, even not in a case where a coverage area of a radio communication device has one radio communication terminal not linked with a target and one target not linked with a radio communication terminal.

Figure 13D:
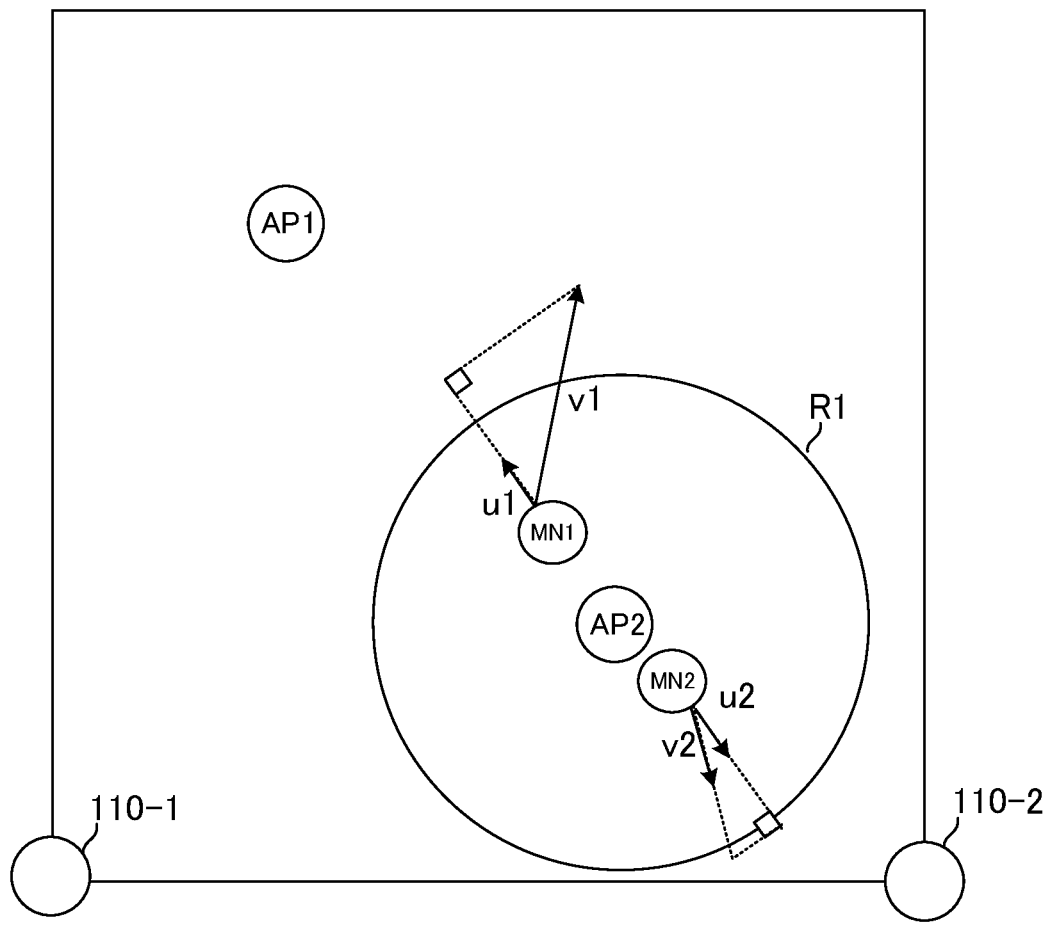
FIG. 13D illustrates another estimation operation of the radio communication device according to Embodiment 2.

FIG. 13D illustrates another estimation operation of the radio communication device. The radio communication device performs two communications between MNs 1 and 2 and AP2 in a short period of time, and determines whether MN1 and MN2 have moved toward AP2 based on whether the received power increases or decreases. That is, information of u1 and u2 is acquired.

Under the detection operation of tracking device 110 in FIG. 13A, it is possible to figure out that MN1 corresponds to T1 and MN2 corresponds to T2 by determining whether u1 and u2 have moved in directions close to v1 and v2 respectively.

Thus, in the present embodiment, the use of the position information and the velocity information enables identification of the targets and the radio communication terminals even with a small number of access points.

Note that, by way of example, radio communicator 12 may operate in the second mode (the position estimation mode) with a narrower coverage area in the embodiments described above, in order to estimate the presence range of radio communication terminal 121 more accurately. Alternatively, radio communicator 12 may perform a three-point survey using the RSSI of three radio communication devices 120 to estimate the presence range of radio communication terminal 121. When it is difficult to use the RSSI of three radio communication devices 120, radio communicator 12 may use the RSSI of less than three radio communication devices 120 to figure out an approximate presence range of radio communication terminal 121.

Note that, for convenience, the descriptions of the embodiments described above are under a condition where the coverage areas of AP1 to AP9 do not overlap with each other. For example, there is no overlap between coverage area R1 of AP5 and coverage area R2 of AP9 illustrated in FIG. 4C. The coverage areas of AP1 to AP9, however, may be overlapped with each other. For example, it may be determined whether radio communication terminal 121 is included in an overlapped portion by determining whether all radio communication devices 120 composing the overlapped portion with the respective coverage areas receive a radio signal from radio communication terminal 121. Further, the overlapped portion may be defined as a new independent coverage area, and applied as the coverage area of radio communication device 120 according to the present disclosure.

In the embodiments described above, the millimeter wave radar is used to detect the position of target T. In addition to that, another embodiment is also conceivable of acquiring biometric information such as heartbeat and respiration of target T in parallel by the millimeter wave radar. The parallel acquisition of the biometric information of target T enables easier health management of the person as target T.

In the embodiments described above, estimation and identification apparatus 2 includes controller 10, tracker 11, radio communicator 12, storage 13, and analyzer 14. Alternatively, it is also conceivable as another embodiment that estimation and identification apparatus 2 includes controller 10, storage 13, and analyzer 14, and tracker 11, and radio communicator 12 are provided separately. In this case, estimation and identification apparatus 2 receives detection information indicating a detection result of target T from tracker 11, and receives reception results of signals transmitted from radio communication terminal 121 attached to target T in one or more radio communication devices 120 from radio communicator 12. The detection result includes, for example, the detection position and/or the detection velocity. The reception result includes, for example, the presence or absence of a response from radio communication terminal 121 and/or reception quality information.

In the description of each embodiment described above, " . . . er (or)" used for each component may be replaced with another term such as " . . . circuit (circuitry)", " . . . device", " . . . unit" or " . . . module".

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof. The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

An estimation and identification apparatus according to the present disclosure includes: a plurality of tracking devices, each of which in operation, emits an electromagnetic wave or a sound wave, and detects a position of an identification target holding a radio communication terminal, based on a reflected wave of the electromagnetic wave or the sound wave by the identification target; a plurality of radio communication devices, each of which in operation, performs radio communication with the radio communication terminal, and receives identification information of the radio communication terminal from the radio communication terminal; and analysis circuitry, which, in operation, identifies the identification target and estimates the position of the identification target, based on a result of the radio communication, the detected position of the identification target, and the identification information.

In the estimation and identification apparatus according to the present disclosure, the analysis circuitry identifies the identification target and estimates the position of the identification target, for each of the plurality of radio communication devices, by linking the radio communication terminal in a coverage area of the radio communication device with the detected position of the identification target included in the coverage area of the radio communication device.

In the estimation and identification apparatus according to the present disclosure, the analysis circuitry unlinks the radio communication terminal included in the coverage area of each of the radio communication devices from the position of the identification target not included in the coverage area of the radio communication device.

In the estimation and identification apparatus according to the present disclosure, the analysis circuitry extracts the radio communication terminal that is included in the coverage area of each of the radio communication devices and is not linked one-to-one with the position of the identification target included in the coverage area of the radio communication device, extracts the position of the identification target that is included in the coverage area of each of the radio communication devices and is not linked with the radio communication terminal included in the coverage area of the radio communication device, and when the number of the radio communication terminals not linked with any of the positions of the identification targets among the extracted radio communication terminals and the number of the extracted positions of the identification targets are both equal to one, the analysis circuitry links the extracted radio communication terminal one-to-one with the extracted position of the identification target.

In the estimation and identification apparatus according to the present disclosure, the analysis circuitry links, with the extracted positions of the identification targets, all the radio communication terminals that are included in the coverage area of each of the radio communication devices and are not linked one-to-one with the position of the identification target included in the coverage area of the radio communication device, when either the number of the radio communication terminals not linked with any of the positions of the identification targets among the extracted radio communication terminals or the number of the extracted positions of the identification targets is different from one.

In the estimation and identification apparatus according to the present disclosure, the analysis circuitry unlinks, from the extracted position of the identification target, the radio communication terminal that is included in the coverage area of each of the radio communication devices and is other than the radio communication terminal linked one-to-one with the extracted position of the identification target.

In the estimation and identification apparatus according to the present disclosure, the analysis circuitry performs ranking of probabilities of links being made between the position of the identification target included in the coverage area of each of the radio communication devices and the radio communication terminals on a one-to-many basis.

In the estimation and identification apparatus according to the present disclosure, the analysis circuitry performs the ranking of the probabilities of the links based on at least one of time the links are made, the position of the linked identification target, or frequency of the links.

The estimation and identification apparatus according to the present disclosure further includes a storage element, which in operation, stores at least one of the links or the ranking, wherein the analysis circuitry extracts a behavioral characteristic of the identification target based on the links and the ranking read out from the storage element.

In the estimation and identification apparatus according to the present disclosure, the coverage area is variable.

In the estimation and identification apparatus according to the present disclosure, the plurality of tracking devices detect a velocity of the identification target, the plurality of radio communication devices estimate a velocity of the radio communication terminal based on a received signal strength indicator of the radio communication, and the analysis circuitry identifies the identification target and estimates the position and the velocity of the identification target based on the result of the radio communication, the detected position and velocity of the identification target, the estimated velocity of the radio communication terminal, and the identification information.

In the estimation and identification apparatus according to the present disclosure, the plurality of tracking devices detect the velocity of the identification target, the plurality of radio communication devices hold a map for the received signal strength indicator of the radio communication terminal, the map having been made based on at least one of the position or the velocity of the radio communication terminal, and estimate the position and the velocity of the radio communication terminal based on the received signal strength indicator of the radio communication and the map, and the analysis circuitry identifies the identification target and estimates the position and the velocity of the identification target based on the result of the radio communication, the detected position and velocity of the identification target, the estimated position and velocity of the radio communication terminal, and the identification information.

An estimation and identification apparatus according to the present disclosure includes reception circuitry, which, in operation, receives detection information indicating a detection result of a target by a radar, a reception result, in one or more radio communication devices, of a signal transmitted from a radio communication terminal attached to the target, and identification information of the target included in the signal; and processing circuitry, which, in operation, estimates a position of the target and identifies the target based on the detection information, the reception result, and the identification information.

An estimation and identification system according to the present disclosure includes: the estimation and identification apparatus according to the present disclosure; and one or a plurality of radio communication terminals that are capable of performing radio communication with one or the plurality of radio communication devices included in the estimation and identification apparatus, and that transmit specific identification information to at least one of the plurality of radio communication devices.

The disclosure of Japanese Patent Application No. 2018-227966, filed on Dec. 5, 2018, including the specification, drawings and abstract, is incorporated herein by reference in its entirety.

INDUSTRIAL APPLICABILITY

An aspect of the present disclosure is useful for analyzing indoor flow lines of people.

REFERENCE SIGNS LIST

1 Estimation and identification system
2 Estimation and identification apparatus
10 Controller
11 Tracker
12 Radio communicator
13 Storage
14 Analyzer
110 Tracking device
120 Radio communication device
121 Radio communication terminal

The invention claimed is:

1. An estimation and identification apparatus, comprising:
a plurality of tracking devices, each of which in operation, emits an electromagnetic wave or a sound wave, and detects a position of an identification target holding a radio communication terminal, based on a reflected wave of the electromagnetic wave or the sound wave by the identification target;
a plurality of radio communication devices, each of which in operation, performs radio communication with the radio communication terminal, and receives identification information of the radio communication terminal from the radio communication terminal; and
analysis circuitry, which, in operation, identifies the identification target and estimates the position of the identification target, based on a result of the radio communication, the detected position of the identification target, and the identification information, wherein:
the plurality of radio communication devices each have a coverage area that includes an area not overlapping with each other, and that is narrower than a detection area of each of the plurality of tracking devices, and
the analysis circuitry identifies the identification target and estimates the position of the identification target when the radio communication terminal enters the coverage area of each of the plurality of radio communication devices.

2. The estimation and identification apparatus according to claim 1, wherein the analysis circuitry identifies the identification target and estimates the position of the identification target, for each of the plurality of radio communication devices, by linking the radio communication terminal in the coverage area of the radio communication device with the detected position of the identification target included in the coverage area of the radio communication device.

3. The estimation and identification apparatus according to claim 2, wherein the analysis circuitry unlinks the radio communication terminal included in the coverage area of each of the radio communication devices from the position of the identification target not included in the coverage area of the radio communication device.

4. The estimation and identification apparatus according to claim 2, wherein the analysis circuitry:
extracts the radio communication terminal that is included in the coverage area of each of the radio communication devices and is not linked one-to-one with the position of the identification target included in the coverage area of the radio communication device,
extracts the position of the identification target that is included in the coverage area of each of the radio communication devices and is not linked with the radio communication terminal included in the coverage area of the radio communication device, and
when the number of the radio communication terminals not linked with any of the positions of the identification targets among the extracted radio communication terminals and the number of the extracted positions of the identification targets are both equal to one, the analysis circuitry links the extracted radio communication terminal one-to-one with the extracted position of the identification target.

5. The estimation and identification apparatus according to claim 4, wherein the analysis circuitry links, with the extracted positions of the identification targets, all the radio communication terminals that are included in the coverage area of each of the radio communication devices and are not linked one-to-one with the position of the identification target included in the coverage area of the radio communication device, when either the number of the radio communication terminals not linked with any of the positions of the identification targets among the extracted radio communication terminals or the number of the extracted positions of the identification targets is different from one.

6. The estimation and identification apparatus according to claim 4, wherein the analysis circuitry unlinks, from the extracted position of the identification target, the radio communication terminal that is included in the coverage area of each of the radio communication devices and is other than the radio communication terminal linked one-to-one with the extracted position of the identification target.

7. The estimation and identification apparatus according to claim 2, wherein the analysis circuitry performs ranking of probabilities of links being made between the position of the identification target included in the coverage area of each of the radio communication devices and the radio communication terminals on a one-to-many basis.

8. The estimation and identification apparatus according to claim 7, wherein the analysis circuitry performs the ranking of the probabilities of the links based on at least one of time the links are made, the position of the linked identification target, or frequency of the links.

9. The estimation and identification apparatus according to claim 7, further comprising a storage element, which in operation, stores at least one of the links or the ranking, wherein the analysis circuitry extracts a behavioral characteristic of the identification target based on the links and the ranking read out from the storage element.

10. The estimation and identification apparatus according to claim 2, wherein, the coverage area is variable.

11. The estimation and identification apparatus according to claim 1, wherein;
the plurality of tracking devices detect a velocity of the identification target,
the plurality of radio communication devices estimate a velocity of the radio communication terminal based on a received signal strength indicator of the radio communication, and
the analysis circuitry identifies the identification target and estimates the position and the velocity of the identification target based on the result of the radio communication, the detected position and velocity of the identification target, the estimated velocity of the radio communication terminal, and the identification information.

12. The estimation and identification apparatus according to claim 11, wherein
the plurality of tracking devices detect the velocity of the identification target,
the plurality of radio communication devices hold a map for the received signal strength indicator of the radio communication terminal, the map having been made based on at least one of the position or the velocity of the radio communication terminal, and estimate the position and the velocity of the radio communication terminal based on the received signal strength indicator of the radio communication and the map, and
the analysis circuitry identifies the identification target and estimates the position and the velocity of the identification target based on the result of the radio communication, the detected position and velocity of the identification target, the estimated position and velocity of the radio communication terminal, and the identification information.

13. An estimation and identification system, comprising:
an estimation and identification apparatus, including:
a plurality of tracking devices, each of which in operation, emits an electromagnetic wave or a sound wave, and detects a position of an identification target holding a radio communication terminal, based on a reflected wave of the electromagnetic wave or the sound wave by the identification target;
a plurality of radio communication devices, each of which in operation, performs radio communication with the radio communication terminal, and receives identification information of the radio communication terminal from the radio communication terminal; and
analysis circuitry, which, in operation, identifies the identification target and estimates the position of the identification target, based on a result of the radio communication, the detected position of the identification target, and the identification information, wherein:
the plurality of radio communication devices each have a coverage area that includes an area not overlapping with each other, and that is narrower than a detection area of each of the plurality of tracking devices, and
the analysis circuitry identifies the identification target and estimates the position of the identification target when the radio communication terminal enters the coverage area of each of the plurality of radio communication devices; and
one or a plurality of radio communication terminals that are capable of performing radio communication with one or the plurality of radio communication devices included in the estimation and identification apparatus, and that transmit specific identification information to at least one of the plurality of radio communication devices.

* * * * *